(12) United States Patent
Goual et al.

(10) Patent No.: US 11,473,004 B2
(45) Date of Patent: Oct. 18, 2022

(54) MICROEMULSIONS AND USES THEREOF TO DISPLACE OIL IN HETEROGENEOUS POROUS MEDIA

(71) Applicant: University of Wyoming, Laramie, WY (US)

(72) Inventors: Lamia Goual, Laramie, WY (US); Tianzhu Qin, Laramie, WY (US); Gina Javanbakht, Laramie, WY (US); Mohammad Piri, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 166 days.

(21) Appl. No.: 15/367,478

(22) Filed: Dec. 2, 2016

(65) Prior Publication Data

US 2018/0155610 A1 Jun. 7, 2018

(51) Int. Cl.
*C09K 8/584* (2006.01)
*C09K 8/524* (2006.01)
*E21B 43/16* (2006.01)

(52) U.S. Cl.
CPC .............. *C09K 8/584* (2013.01); *C09K 8/524* (2013.01); *E21B 43/16* (2013.01)

(58) Field of Classification Search
CPC ......... C09K 8/584; C09K 8/524; E21B 43/16; B01F 3/12; B01F 17/0021; B01F 17/0085–0092; C02F 2103/06; C11D 1/825–8255
USPC .......................................................... 516/72
See application file for complete search history.

(56) References Cited

U.S. PATENT DOCUMENTS

| | | | |
|---|---|---|---|
| 3,307,628 A * | 3/1967 | Sena | C09K 8/584 166/270.2 |
| 3,888,308 A * | 6/1975 | Gale | C09K 8/584 166/270.1 |
| 4,146,499 A * | 3/1979 | Rosano | B01F 17/0085 252/186.32 |
| 4,528,106 A | 7/1985 | Grolitzer | |
| 4,706,749 A | 11/1987 | Hayes et al. | |
| 5,462,690 A | 10/1995 | Rhinesmith | |
| 5,662,957 A | 9/1997 | Wright | |
| 6,280,533 B1 | 8/2001 | Hoppe et al. | |
| 6,306,249 B1 | 10/2001 | Galante et al. | |
| 6,369,014 B1 | 4/2002 | Murphy et al. | |
| 6,479,432 B1 | 11/2002 | Sixl | |
| 7,186,675 B2 | 3/2007 | Meine et al. | |
| 7,380,606 B2 | 6/2008 | Pursley et al. | |
| 7,645,723 B2 | 1/2010 | Kirsner et al. | |
| 7,886,824 B2 | 2/2011 | Kakadjian et al. | |
| 8,329,813 B2 | 12/2012 | Johnson et al. | |
| 8,586,686 B2 | 11/2013 | Zecha et al. | |
| 8,950,481 B2 | 2/2015 | Dakin et al. | |
| 9,222,013 B1 | 12/2015 | Champagne et al. | |
| 9,434,793 B1 | 9/2016 | Kane et al. | |
| 9,464,223 B2 | 10/2016 | Champagne et al. | |
| 9,505,970 B2 | 11/2016 | Vaughn et al. | |
| 9,578,874 B2 | 2/2017 | Crosby et al. | |
| 9,708,497 B2 | 7/2017 | Thornberry et al. | |
| 9,759,721 B2 | 9/2017 | Lozano Sanchez et al. | |
| 9,868,893 B2 | 1/2018 | Saboowala et al. | |
| 9,884,988 B2 | 2/2018 | Dismuke et al. | |
| 9,994,762 B2 | 6/2018 | Hill et al. | |
| 10,000,693 B2 | 6/2018 | Hill et al. | |
| 10,011,703 B2 | 7/2018 | Vandezande et al. | |
| 10,087,361 B2 | 10/2018 | Hill et al. | |
| 10,093,820 B2 | 10/2018 | Zippies et al. | |
| 10,138,441 B2 | 11/2018 | Holland et al. | |
| 10,155,805 B2 | 12/2018 | Olijve et al. | |
| 10,184,329 B2 | 1/2019 | Pietrangeli et al. | |
| 10,232,333 B2 | 3/2019 | Williams et al. | |
| 10,279,043 B2 | 5/2019 | Van Spreuwel-Goossens | |
| 10,280,360 B2 | 5/2019 | Champagne et al. | |
| 10,287,483 B2 | 5/2019 | Saboowala et al. | |
| 10,334,853 B2 | 7/2019 | Van Buskirk et al. | |
| 10,416,165 B2 | 9/2019 | Kurosawa et al. | |
| 10,433,545 B2 | 10/2019 | Karandikar | |
| 10,442,939 B2 | 10/2019 | Meindl et al. | |
| 10,463,680 B2 | 11/2019 | Sommer et al. | |
| 10,494,564 B2 | 12/2019 | Hikem et al. | |
| 10,542,746 B2 | 1/2020 | Policello et al. | |
| 10,556,133 B2 | 2/2020 | Dussaud et al. | |
| 10,577,531 B2 | 3/2020 | Pursley et al. | |
| 10,857,164 B2 | 12/2020 | Sommer et al. | |
| 2003/0166472 A1 | 9/2003 | Pursley et al. | |
| 2004/0004206 A1 | 1/2004 | Kelley et al. | |
| 2005/0049163 A1 | 3/2005 | Akbarian et al. | |

(Continued)

FOREIGN PATENT DOCUMENTS

EP    2 918 663 A1    9/2015
WO    WO 2010/129842 A1    11/2010

(Continued)

OTHER PUBLICATIONS

Wormuth et al., Phase Behavior of Branched Surfactants in Oil and Water, Langmuir 1991, 7, 2048-2053. (Year: 1991).*
Chemical Book. Properties of polyoxyethylene sorbitan monopalmitate, Cremophor EL, poly(ethylene glycol), DL-limonene, and isopropyl alcohol. www.chemicalbook.com. As viewed on Apr. 4, 2019. (Year: 2019).*
Lowry et al. Molecular simulations of NAPL removal from mineral surfaces using microemulsions and surfactants. Colloids and Surfaces A: Physiochemical and Engineering Aspects. vol. 506, pp. 485-494. Available online Jul. 2, 2016. (Year: 2016).*
Triton X-100 Product Information. Sigma. Apr. 21, 1999. (Year: 1999).*

(Continued)

*Primary Examiner* — Stephen E Rieth
(74) *Attorney, Agent, or Firm* — Patterson + Sheridan, LLP

(57) ABSTRACT

Novel microemulsion formulations comprising a surfactant or combination of surfactants are disclosed for improved crude oil cleanup or recovery from subsurface geological formations, especially those containing carbonate cements.

11 Claims, 18 Drawing Sheets

(56) References Cited

U.S. PATENT DOCUMENTS

| | | | |
|---|---|---|---|
| 2006/0096757 A1* | 5/2006 | Berry | C09K 8/40 166/291 |
| 2007/0227557 A1 | 10/2007 | Ohlhausen et al. | |
| 2008/0011486 A1 | 1/2008 | Zhang et al. | |
| 2009/0264598 A1* | 10/2009 | Bittner | B01F 17/0021 525/231 |
| 2009/0281004 A1 | 11/2009 | Ali et al. | |
| 2012/0003581 A1 | 1/2012 | Yang et al. | |
| 2012/0208898 A1 | 8/2012 | Dong et al. | |
| 2013/0067999 A1 | 3/2013 | Xu et al. | |
| 2013/0261033 A1* | 10/2013 | Nguyen | C09K 8/584 507/240 |
| 2014/0017301 A1 | 1/2014 | Cevc | |
| 2015/0083645 A1 | 3/2015 | Calvert et al. | |
| 2015/0197683 A1 | 7/2015 | Hategan et al. | |
| 2016/0017204 A1 | 1/2016 | Hill et al. | |
| 2016/0022569 A1 | 1/2016 | Tonge et al. | |
| 2016/0075934 A1 | 3/2016 | Champagne et al. | |
| 2016/0186032 A1 | 6/2016 | Yu et al. | |
| 2016/0362631 A1 | 12/2016 | Holland et al. | |
| 2017/0009128 A1 | 1/2017 | Towler | |
| 2017/0029745 A1 | 2/2017 | Nakamura et al. | |
| 2017/0292062 A1 | 10/2017 | Wylde et al. | |
| 2018/0007895 A1 | 1/2018 | Karandikar et al. | |
| 2018/0177715 A1 | 6/2018 | Bochenek | |
| 2018/0194903 A1 | 7/2018 | Raja et al. | |
| 2019/0016678 A1 | 1/2019 | Ganguly-Mink et al. | |
| 2019/0055459 A1 | 2/2019 | Zelenev et al. | |
| 2019/0127729 A1 | 5/2019 | Schuster | |
| 2019/0201858 A1 | 7/2019 | Braden et al. | |
| 2020/0390699 A1 | 12/2020 | Solfato et al. | |
| 2021/0032574 A1 | 2/2021 | Konya et al. | |

FOREIGN PATENT DOCUMENTS

| | | |
|---|---|---|
| WO | WO 2013/158567 A1 | 10/2013 |
| WO | WO 2014/153078 A1 | 9/2014 |
| WO | WO 2015/116754 A1 | 8/2015 |

OTHER PUBLICATIONS

BIO-SOFT N-Series Product Guide. Stepan Company. Sep. 2008. (Year: 2008).*

Buckley, J. S., "Wetting Alteration of Solid Surfaces by Crude Oils and Their Asphaltenes", Revue de L'Institut Français du Petrole, vol. 53, No. 3, May-Jun. 1998 (Ten (10) pages).

Al-Raoush, R., "Impact of Wettability on Pore-Scale Characteristics of Residual Nonaqueous Phase Liquids", Environmental Science & Technology, vol. 43, No. 13, American Chemical Society, May 26, 2009, pp. 4796-4801 (Six (6) pages).

Iglauer, S., et al., "Comparison of Residual Oil Cluster Size Distribution, Morphology and Saturation in Oil-Wet and Water-Wet Sandstone", Journal of Colloid and Interface Science, 375, Feb. 23, 2012, Elsevier, Inc. pp. 187-192 (Six (6) pages).

Kumar, M., et al., "Visualizing and Quantifying the Residual Phase Distribution in Core Material", Petrophysics, vol. 51, No. 5, Oct. 2010, pp. 323-332 (Ten (10) pages).

Suicmez, V. S., et al., "Effects of Wettability and Pore-Level Displacement on Hydrocarbon Trapping", Advances in Water Resources, 31, 2008, pp. 503-512 (Ten (10) pages).

Trojer, M., et al., "Stabilizing Fluid-Fluid Displacements in Porous Media Through Wettability Alteration", Physical Review Applied 3, 054008, 2015, American Physical Society, pp. 1-8 (Eight (8) pages).

Piri, M., et al., "Three-Phase Threshold Capillary Pressures in Noncircular Capillary Tubes with Different Wettabilities Including Contact Angle Hysteresis", Physical Review E 70, 061603, 2004, The American Physical Society, pp. 1-17 (Seventeen (17) pages).

Jawitz, J. W., "Evaluation of Remediation Performance and Cost for Field-Scale Single-Phase Microemulsion (SPME) Flushing", J. Environ. Sci. Health, A36 (8), 2001 Marcel Dekker, Inc., pp. 1437-1450 (Fourteen (14) pages).

Battelle and Duke Engineering and Services, "Surfactant-Enhanced Aquifer Remediation (SEAR) Design Manual" NFESC Technical Report TR-2206-ENV, Apr. 2002 (One-Hundred and Ten (110) pages).

Schnaar, G., et al., "Pore-Scale Characterization of Organic Immiscible-Liquid Morphology in Natural Porous Media Using Synchrotron X-ray Microtomography", Environmental Science & Technology, vol. 39, No. 21, 2005, American Chemical Society, pp. 8403-8410 (Eight (8) pages).

Istok, J. D., et al., "In-situ, Field Scale Evaluation of Surfactant-Enhanced DNAPL Recovery Using a Single-Well, "Push-Pull" Test", Final Report, Environmental Management Sciences Program, U.S. Department of Energy, pp. 1-17 (Seventeen (17) pages), Final Report 1999.

Rosen, M. J., et al., "Surfactants and Interfacial Phenomena", Fourth Edition, 2012, John Wiley & Sons, Inc., Hoboken, New Jersey, Contents and Preface (Fifteen (15) pages).

Javanbakht, G., et al., "Mobilization and Micellar Solubilization of NAPL Contaminants in Aquifer Rocks", Journal of Contaminant Hydrology, 185-186, 2016, Elsevier B.V., pp. 61-73 (Thirteen (13) pages).

Castro Dantas, T. N., et al., "Implementing New Microemulsion Systems in Wettability Inversion and Oil Recovery from Carbonate Reservoirs", Energy & Fuels, 28, 2014, American Chemical Society, pp. 6749-6759 (Eleven (11) pages).

Pietrangeli, G., et al., "Treatment of Water in Heavy Crude Oil Emulsions with Innovative Microemulsion Fluids", Presentation at the SPE Heavy and Extra Heavy Oil Conference—Latin America, Madellin, Colombia, Sep. 24-26, 2014, Society of Petroleum engineers, SPE International, SPE-171140-MS, (Fifteen (15) pages).

Jeirani, Z., et al. "A Novel Effective Triglyceride Microemulsion for Chemical Flooding", Presentation at the SPE Asia Pacific Oil and Gas Conference and Exhibition, Perth, Australia, Oct. 22-24, 2012, Society of Petroleum Engineers, SPE Internationa, SPE 158301 (Thirteen (13) pages).

International Search Report (PCT/ISA/220 & PCT/ISA/210) issued in PCT Application No. PCT/US17/64209 dated Feb. 7, 2018 (three pages).

Written Opinion (PCT/ISA/237) issued in PCT Application No. PCT/US17/64209 dated Feb. 7, 2018 (six pages).

International Preliminary Report on Patentability (PCT/IB/373) issued in PCT Application No. PCT/US2017/064209 dated Jun. 4, 2019, including document C18 (Written Opinion (PCT/ISA/237) previously filed on Apr. 6, 2018) (eight (8) pages).

Sigma-Aldrich, Safety Data Sheet, Triton™ X-100, Version 6.4, Jun. 29, 2019, www.sigmaaldrich.com, (nine (9) pages).

Sigma-Aldrich, Safety Data Sheet, Tergitol® NP-9, Version 5.8, Oct. 19, 2018, sigma-aldrich.com, (eight (8) pages).

Alpes et al., "Reconstitution of Na+ /K +-ATPase into PhosphatidylchoHne Vesicles By Dialysis Of Nonionic alkyl Maltoside Detergents", Biochimica et Biophysica Acta, 1988, pp. 379-388, vol. 946, (10 pages).

Alvarez et al., "Aqueous Immiscibility Of Cholinium Chloride Ionic Liquid and Triton Surfactants", J. Chem. Thermodynamics, 2015, pp. 86-93, vol. 91, (right (8) pages).

Amin et al., "Monitoring Corrosion and Corrosion Control Of Iron in HCI by Non-Ionic Surfactants of The TRITON-X Series—Part II. Temperature Effect, Activation Energies and Thermodynamics of Adsorption", Corrosion Science, 2011, pp. 540-548, vol. 53, (nine (9) pages).

Anufrikov el al., "Impact of Bioorganic Additives of Different Nature on Aggregation Behavior and on Cloud Point Temperatures of Nonionic Surfactants Tergitol NP-7 and Triton X-114 in Buffer Solutions", Colloid Journal, 2019, pp. 627-633, vol. 81, No. 6, (seven (7) pages).

"BIO-SOFT® N1-5", Universal Selector, Last Edited: Jun. 8, 2016, Retrieved from http://coatings.specialchem.com (three (3) pages).

"BIO-SOFT® N1-9", Universal Selector, Last Edited: Jun. 8, 2016, Retrieved from http://coatings.specialchem.com (two (2) pages).

"BIO-SOFT® N23-6.5", Universal Selector, Last Edited: Jun. 8, 2016, Retrieved from http://coatings.specialchem.com (two (2) pages).

"BIO-SOFT® N25-7", Universal Selector, Last Edited: Jun. 8, 2016, Retrieved from http://coatings.specialchem.com (two (2) pages).

(56) References Cited

OTHER PUBLICATIONS

"Final Alternatives Assessment Nonylphenol Ethoxylates (NPE) in All-Purpose Cleaners", BizNgo, Nov. 2013, pp. 1-143, (143 pages).
"Bio-Based Plant Cleaner Material Safety Data Sheet", Green Earth Technologies, Inc., Revision date: Aug. 4, 2010, (one (1) page).
Chen et al., "QSPR for HLB Values of Nonionic Surfactants Using Two Simple Descriptors", Journal of Dispersion Science and Technology, 2009, pp. 1481-1485, (six (6) pages).
Cserhati et al., "Effect Of Salt Concentration and pH On The Hydrophobicity Parameters Of Surfactants Studided By TLC and Spectral Mapping Techique", J. Biochem. Biophys. Methods, 1999, pp. 1-15, vol. 38, (15 pages).
"Decyl beta-D-maltopyranoside, >=98% (GC)", PubChem, Modify date: Mar. 14, 2018, Retrieved from https://pubchem.ncbi.nlm.nih.gov (seven (7) pages).
Halko et al., "Study of High-Performance Liquid Chromatographic Separation Of Selected Herbicides By Hydro-Methanolic and Micellar Liquid Chromatography Using Genapol X-080 Non-Ionic Surfactant As Mobile Phase Constituent", Analytica Chimica Acta, 2002, pp. 325-333, (nine (9) pages).
Jaiswal et al., "Investigating The Micellization Of the Triton-X Surfactants: A Non-Invasive Fluorometric and Calorimetric Approach", Chemical Physics Letters, 2016, pp. 18-24, (seven (7) pages).
Hollis G. L., "Nonionics", Royal Society of Chemistry, 1995, Retrieved from http://ebookcentral.proquest.co (42 pages).
Javanbakht et al., "Impact Of Surfactant Structure On NAPL Mobilization and Solubilization in Porous Media", Ind. Eng. Chem. Res, 2016, pp. 11736-11746, vol. 55, (11 pages).
Kos et al., "Decomposition Of Non-Ionic Surfactant Tergitol TMN-10 By The Fenton Process In The Presence Of Iron Oxide Nanoparticles", Environ Sci Pollut Res, 2014 pp. 12223-12232, vol. 21, (10 pages).
Levine et al., "Disrupting Mitochondrial Function With Surfactants Inhibits MA-10 Leydig Cell Steroidogenesis", Cell Biol Toxicol, 2007, pp. 385-400, vol. 23, (16 pages).
Markovic et al., "Synthesis of $C_7$—$C_{16}$-Alkyl Maltosides In The Presence of Tin(IV) Chloride As A Lewis Acid Catalyst", Bull. Chem. Soc. Ethiop., 2011 pp. 83-90, vol. 25, No. 1, (eight (8) pages).
Mirchi et al., "A Systematic Study on the Impact of Surfactant Chain Length on Dynamic Interfacial Pro", Ind. Eng. Chem. Res, 2017, pp. 13677-13695, vol. 56, (19 pages).
Ngo et al., "Adsorption of Dimethyldodecylamine Oxide and Its Mixtures with Triton X-100 at the Hydrophilic Silica/Water Interface Studied Using Total Internal Reflection Raman Spectroscopy", J. Phys. Chem. B 2016, pp. 12346-12357, vol. 120, (12 pages).
"Nonyl-beta-D-1-thiomaltoside, >=98.0% (TLC)", PubChem, Modify date: Mar. 14, 2018, Retrieved from https://pubchem.ncbi.nlm.nih.gov (seven (7) pages).
"N-Nonyl-β-D-Maltopyranoside, Anagrade" Safety Data Sheet, Revision date Jan. 22, 2014, (two (2) pages).
"N-Octyl beta-D-maltoside, >=99.0% (HPLC)", Modify date: Mar. 14, 2018, Retrieved from https://pubchem.ncbi.nlm.nih.gov (seven (7) pages).
"N-Octyl-β-D- Maltopyranoside, Sol-Grade", Safety Data Sheet, Revision date Jan. 22, 2014, (two (2) pages).
Ostermeier et al., "Structure at 2.7 A Resolution Of The Paracoccus Denitrijicans Two-Subunit Cytochrome C Oxidase Complexed With An Antibody Fv Fragment", Proc. Natl. Acad. Sci, 1997, pp. 10547-10553, vol. 94, (seven (7) pages).
Prak D., "Solubilization Of Nitrotoluenes In Micellar Nonionic Surfactant Solutions", Chemosphere, 2007, pp. 1961-1967, vol. 38, (seven (7) pages).
Sannaningannavar et al., "Ultrasonic Study Of Thermo-Acoustic Parameters Of The Polysorbate 20, 40, 60 And 80 Liquid Surfactants At Different Temperatures", Journal of Molecular Liquids, 2014, pp. 244-248, vol. 196, (five (5) pages).
Shuler et al., "Screening Methods For Selection Of Surfactant Formulations For IOR From Fractured Carbonate Reservoirs", California Institute Of Technology, 2005, pp. 1-41, Pasadena, CA, (41 pages).
Sis et al., "Synergism in Sodium Oleate/Ethoxylated Nonylphenol Mixtures", Journal of Dispersion Science and Technology, 2005, pp. 605-614, vol. 26, (10 pages).
Tanaka et al., "Effect of Nonionic Surfactants on the Photochemistry of 3-(4-Chlorophenyl)-1,1-dimethylurea in Aqueous Solution",J. Agric. Food Chem., 1979, pp. 774-799, vol. 27, No. 4, (six (6) pages).
"Tergitoltm TMN-100X 90% Surfanctant", DOW Surfactants, Posted on : Dec. 20, 2015, (one (1) page).
"Nonoxynol-9", Modify date: Feb. 26, 2020, PubChem, (43 pages).
"Regulation (EC) No. 648/2004 on Detergents and Amendments (907/2006)", The Dow Chemical Company, Effective date: Jan. 25, 2012, (five (5) pages).
"Triton(TM) X-114, laboratory grade", PubChem, Modify date: Mar. 14, 2018, Retrieved from https://pubchem.ncbi.nlm.nih.gov (seven (7) pages).
"Undecyl beta-D-maltoside, >=99.0% (TLC)", PubChem, Modify date: Mar. 14, 2018, Retrieved from https://pubchem.ncbi.nlm.nih.gov (seven (7) pages).
"Novel CO2 Foam Concepts and Injection Schemes for Improving CO2 Sweep Efficiency in Sandstone and Carbonate Hydrocarbon Formations", Department of Petroleum & Ecosystems Engineering, 2015, pp. 1-336, (336 pages).
Vanaken et al., "Alkyl Glycoside Detergents: Synthesis and Applications to the Study of Membrane Proteins", Methods In Enzymology, 1986, pp. 27-35, vol. 125, (nine (9) pages).
Extended European Search Report issued in European Application No. 17875280.4 dated May 29, 2020 (nine (9) pages).
Javanbakht et al., "Impact of Surfactant Structure on Wettability and Pore-Scale Displacement Mechanisms of Non-Aqueous-Phase Liquids in Heterogeneous Rocks," 23rd International Petroleum Environmental Conference, Nov. 9, 2016, forty-seven (47) pages.
"Process Aids and Intermediates for the Chemical Industry—Surfactants," published by Clariant, 2013, twenty (20) pages.
"GENAPOL X-050," Safety Data Sheet published by Clariant, revision date: Oct. 22, 2020, date of printing: Mar. 18, 2021, thirteen (13) pages.
"GENAPOL X-050," Safety Data Sheet published by Clariant, revision date: Oct. 22, 2020, date of printing: Apr. 6, 2021, thirteen (13) pages.
"GENAPOL X-060," Safety Data Sheet published by Clariant, revision date: Jun. 7, 2018, date of printing: Nov. 21, 2018, twelve (12) pages.
"GENAPOL X-060," Safety Data Sheet published by Clariant, revision date: Jun. 9, 2020, date of printing: Apr. 6, 2021, thirteen (13) pages.
"GENAPOL X-080," from CAS DataBase List of ChemicalBook, web archive from Mar. 3, 2014, three (3) pages.
"GENAPOL X-080," from CAS DataBase List of ChemicalBook, web archive from Apr. 25, 2017, two (2) pages.
"GENAPOL X-080," Safety Data Sheet published by Clariant, revision date: May 23, 2018, date of printing: Mar. 5, 2020, twelve (12) pages.
"GENAPOL X-080," Safety Data Sheet published by Clariant, revision date: Mar. 6, 2020, date of printing: Apr. 6, 2021, twelve (12) pages.
"GENAPOL X-089," Safety Data Sheet published by Clariant, revision date: Feb. 17, 2021, date of printing: Apr. 6, 2021, twelve (12) pages.
"TWEEN 20-LQ-(AP)," Safety Data Sheet published by Croda, revision date: Mar. 23, 2016, print date: Mar. 31, 2016, eight (8) pages.
"TWEEN 20-LQ-(AP)," Safety Data Sheet published by Croda, revision date: Aug. 6, 2019, print date: Aug. 6, 2019, nine (9) pages.
"TWEEN 20 HP-LQ-(MH)," Safety Data Sheet published by Croda, revision date: Oct. 16, 2019, print date: Jan. 19, 2021, eight (8) pages.

(56) References Cited

OTHER PUBLICATIONS

Combined Declaration of Use and/or Excusable Nonuse/Application for Renewal of Registration of a Mark—TWEEN, Sep. 2, 2014, fifteen (15) pages.
"TWEEN 21-LQ-(AP)," Safety Data Sheet published by Croda, revision date: Mar. 24, 2016, print date: Jan. 19, 2021, eight (8) pages.
"TWEEN 21-LQ-(AP)," Safety Data Sheet published by Croda, revision date: Mar. 24, 2016, print date: Apr. 1, 2016, eight (8) pages.
"TWEEN 40-LQ-(AP)," Safety Data Sheet published by Croda, revision date: Mar. 24, 2016, print date: Jan. 19, 2021, eight (8) pages.
"Polysorbate 40," from ChEBI, web archive from Aug. 20, 2019, three (3) pages.
"Polysorbate 40," Safety Data Sheet published by Spectrum, revision date: Apr. 14, 2016, preparation date: Apr. 14, 2016, ten (10) pages.
"TWEEN 60-LQ-(AP)," Safety Data Sheet published by Croda, revision date: Oct. 16, 2019, print date: Oct. 16, 2019, nine (9) pages.
"TWEEN 60-NV-LQ-(AP)," Safety Data Sheet published by Croda, revision date: Oct. 16, 2019, print date: Jan. 19, 2021, nine (9) pages.
"TWEEN 65-LQ-(AP)," Safety Data Sheet published by Croda, revision date: Mar. 24, 2016, print date: Apr. 1, 2016, seven (7) pages.
"TWEEN 65-SO-(MV)," Safety Data Sheet published by Croda, revision date: Sep. 9, 2019, print date: Oct. 15, 2019, ten (10) pages.
"TWEEN 65-LQ-(AP)," Safety Data Sheet published by Croda, revision date: Mar. 24, 2016, print date: Jan. 19, 2021, seven (7) pages.
"TWEEN 80-NV-LQ-(AP)," Safety Data Sheet published by Croda, revision date: Nov. 6, 2017, print date: Dec. 12, 2017, ten (10) pages.
"Polysorbate 80," from ChEBI, web archive from Sep. 26, 2016, four (4) pages.
"TWEEN 80-LQ-(AP)," Safety Data Sheet published by Croda, revision date: Oct. 16, 2019, print date: Jan. 19, 2021, nine (9) pages.
"Dow Surfactants Reference Chart," published by Dow, 2020, sixteen (16) pages.
"Dow Surfactants Reference Chart," published by Dow, Jun. 2013, eight (8) pages.
"Tergitol NP-6 Surfactant," Safety Data Sheet published by Dow, issue date: Jun. 23, 2020, print date: Jun. 24, 2020, fifteen (15) pages.
"Tergitol NP-7 Surfactant," Safety Data Sheet published by Dow, issue date: Jun. 22, 2020, print date: Jun. 23, 2020, fifteen (15) pages.
"Tergitol NP-8 Surfactant," Safety Data Sheet published by Dow, issue date: Jun. 23, 2020, print date: Jun. 24, 2020, fifteen (15) pages.
"Tergitol NP-9 Surfactant," Safety Data Sheet published by Dow, issue date: Feb. 26, 2015, print date: May 16, 2015, eleven (11) pages.
"Tergitol NP-9," from ChEBI, site accessed on Mar. 16, 2021, three (3) pages.
"Tergitol NP-9," from ChEBI, web archive from Jul. 27, 2019, three (3) pages.
"Tergitol NP-9 Surfactant," Safety Data Sheet published by Dow, issue date: Jun. 23, 2020, print date: Jun. 24, 2020, fifteen (15) pages.
"Tergitol NP-9.5 Surfactant," Safety Data Sheet published by Dow, issue date: Jun. 22, 2020, print date: Jun. 23, 2020, fifteen (15) pages.
"Tergitol NP-10 Surfactant," Safety Data Sheet published by Dow, issue date: Jun. 22, 2020, print date: Jun. 23, 2020, fourteen (14) pages.
"Tergitol NP-11 Surfactant," Safety Data Sheet published by Dow, issue date: Jun. 22, 2020, print date: Jun. 23, 2020, fifteen (15) pages.
Combined Declaration of Use and/or Excusable Nonuse/Application for Renewal of Registration of a Mark—Tergitol, Jul. 10, 2015, seven (7) pages.
"Tergitol NP-12 Surfactant," Safety Data Sheet published by Dow, issue date: Jun. 22, 2020, print date: Jun. 23, 2020, fourteen (14) pages.
"Tergitol NP-13 Surfactant," Safety Data Sheet published by Dow, issue date: Jun. 23, 2020, print date: Jun. 24, 2020, fourteen (14) pages.
"Tergitol NP-15 Surfactant," Safety Data Sheet published by Dow, issue date: Jun. 23, 2020, print date: Jun. 24, 2020, fourteen (14) pages.
"Tergitol TMN 6," CAS No. 60828-78-6, Sigma-Aldrich website accessed on Mar. 9, 2021, three (3) pages.
"Tergitol TMN-6 Surfactant," Safety Data Sheet published by Dow, issue date: Jul. 17, 2018, print date: Jul. 19, 2018, eleven (11) pages.
"Tergitol TMN-10 (90% Aqueous) Surfactant," Safety Data Sheet published by Dow, issue date: Jul. 17, 2018, print date: Jul. 19, 2018, eleven (11) pages.
"Tergitol TMN-100X (90% Aqueous) Surfactant," Safety Data Sheet published by Dow, issue date: Jul. 23, 2018, print date: Jul. 24, 2018, eleven (11) pages.
"Triton CG-50 Surfactant," Safety Data Sheet published by Dow, issue date: Dec. 15, 2020, print date: Dec. 16, 2020, twelve (12) pages.
"Triton CG-50 Surfactant," Safety Data Sheet published by Dow, issue date: Jun. 22, 2015, print date: Jun. 24, 2015, eleven (11) pages.
"Triton CG-110 Surfactant," Safety Data Sheet published by Dow, issue date: Jun. 7, 2018, print date: Jul. 19, 2018, ten (10) pages.
"Triton CG-110 Surfactant," Safety Data Sheet published by Dow, issue date: Jun. 7, 2018, print date: Sep. 1, 2018, ten (10) pages.
"Triton CG-650 Surfactant," Safety Data Sheet published by Dow, issue date: Jun. 7, 2018, print date: Jul. 19, 2018, eleven (11) pages.
"Triton X-100 Surfactant," Safety Data Sheet published by Dow, issue date: Apr. 12, 2016, print date: Jun. 22, 2016, eleven (11) pages.
"Triton X-100," from ChEBI, web archive from Oct. 16, 2017, three (3) pages.
"Triton X-100," from Wikipedia, web archive from 2016, three (3) pages.
"Triton X-100 Surfactant," Safety Data Sheet published by Dow, issue date: Jul. 25, 2018, print date: Feb. 7, 2020, eleven (11) pages.
"Triton X-102 Surfactant," Safety Data Sheet published by Dow, issue date: Jun. 15, 2018, print date: Jul. 19, 2018, ten (10) pages.
"Triton X-114 Surfactant," Safety Data Sheet published by Dow, issue date: Jun. 8, 2018, print date: Jul. 19, 2018, eleven (11) pages.
"Triton X-165 (70% Actives) Surfactant," Safety Data Sheet published by Dow, issue date: Jun. 15, 2018, print date: Jul. 19, 2018, eleven (11) pages.
Combined Declaration of Use and/or Excusable Nonuse/Application for Renewal of Registration of a Mark—Triton, May 20, 2015, seven (7) pages.
Duraimurugan et al., "Performance Evaluation of Tergitol NP-7 and Triton X-114 for the Removal of Crystal Violet Using Cloud-Point Extraction," Chern. Biochem. Eng. Q., 2016, 30(2), 189-198, ten (10) pages.
"Stepan Alkoxylate Product Guide," published by Stepan, 2019, six (6) pages.
"BIO-SOFT N-Series Product Guide," published by Stepan, Sep. 2008, nine (9) pages.
"BIO-SOFT N1-5," Safety Data Sheet published by Stepan, revision date: Dec. 6, 2019, print date: Dec. 6, 2019, seven (7) pages.
"BIO-SOFT N1-7," Safety Data Sheet published by Stepan, revision date: Jun. 12, 2019, print date: Jun. 12, 2019, seven (7) pages.
"BIO-SOFT N1-9," Safety Data Sheet published by Stepan, revision date: Jun. 12, 2019, print date: Jun. 12, 2019, seven (7) pages.
"Stepan Product Bulletin, BIO-SOFT N23 Series," published by Stepan, published Oct. 2013, two (2) pages.

(56) References Cited

OTHER PUBLICATIONS

"BIO-SOFT N23-6.5," Safety Data Sheet published by Stepan, revision date: Jun. 25, 2019, print date: Jun. 25, 2019, seven (7) pages.
"Stepan Product Bulletin, BIO-SOFT N25 Series," published by Stepan, published Oct. 2017, two (2) pages.
"BIO-SOFT N25-7," Safety Data Sheet published by Stepan, revision date: Dec. 11, 2019, print date: Dec. 11, 2019, seven (7) pages.
"BIO-SOFT N25-9," Safety Data Sheet published by Stepan, revision date: Jul. 1, 2019, print date: Jul. 1, 2019, six (6) pages.
"BIO-SOFT N91-6," Safety Data Sheet published by Stepan, revision date: Dec. 12, 2019, print date: Dec. 12, 2019, seven (7) pages.
"BIO-SOFT N91-8," Safety Data Sheet published by Stepan, revision date: Dec. 12, 2019, print date: Dec. 12, 2019, seven (7) pages.
"Global Product Portfolio," published by Stepan, Aug. 2013, seventy-six (76) pages.

* cited by examiner

Solid
Brine
Oil

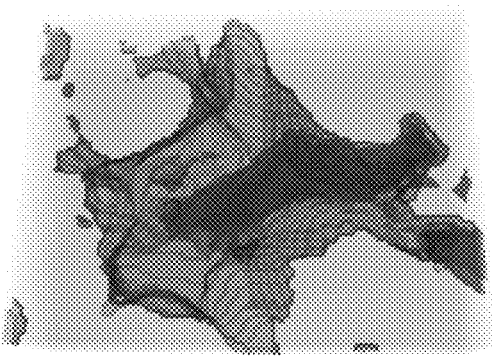
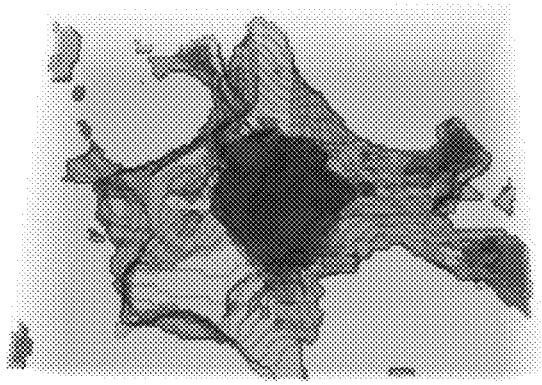

MICROEMULSIONS AND USES THEREOF TO DISPLACE OIL IN HETEROGENEOUS POROUS MEDIA

This invention was made with government support under CBET1351296 awarded by the National Science Foundation. The government has certain rights in the invention.

FIELD OF THE INVENTION

The present invention relates to microemulsions comprising at least one surfactant, a fluid carrier, and a coupling agent. The present invention also relates to using these microemulsions in processes involving more than one well for improving the recovery of crude oil from subsurface geological formations and for the remediation of oil-contaminated aquifers.

BACKGROUND OF THE INVENTION

Mineral heterogeneities are ubiquitous in subsurface geological formations and impact fluid mobility and therefore recovery or cleanup of nonaqueous phase liquids (NAPLs), such as crude oils. The wettability of each mineral is variable, making the wetting character of subsurface formations difficult to describe. Typically, reservoir rocks are dominantly sedimentary (sandstones and carbonates) and are water-wet prior to contact with oil. Although crude oils are predominantly light nonaqueous phase liquids (LNAPLs), they also contain dense nonaqueous phase liquids (DNAPLs) such as asphaltenes that are highly polarizable and surface active. Due to their polynuclear aromatic structure and the presence of heteroatoms (e.g., oxygen, nitrogen, and sulfur), asphaltenes tend to adsorb on mineral surfaces and alter their wettability from water-wet to mixed- or oil-wet (Buckley, 1998; Al-Raoush 2009; Iglauer 2012; Kumar 2010). This wettability alteration directly impacts the displacement mechanisms of NAPLs in porous media (Suicmez, 2008; Al-Raoush, 2009; Trojer, 2015), as it affects the threshold capillary pressure (Piri and Blunt, 2004). Water flooding or pump and treat methods can mobilize a limited amount of NAPL, usually residing in small pores, but leave a significant portion of residual NAPL ganglia trapped within larger pores as capillary forces overcome viscous and buoyancy forces (Jawitz, 2001, SEAR, 2002; Schnaar and Brusseau, 2005).

In order to reduce capillary forces, surfactants are usually injected into the formation through the aqueous phase (Istok, 1999). With their hydrophilic polar heads and hydrophobic aliphatic tails, surfactants can arrange at NAPL/water interfaces and significantly reduce the interfacial tension (IFT) between these phases, thereby enhancing the coalescence and mobilization of NAPL droplets inside pore spaces (Rosen, 2012). They can also adsorb on mineral surfaces and promote the micellar solubilization of asphaltenes (Javanbakht and Goual, 2016).

A major limitation of surfactant flooding or flushing is its inability to significantly restore the wettability of certain oil-wet mineral surfaces back to their original water-wet state and the chemical losses ensuing from surfactant adsorption on formation rocks. This has prompted the use of other additives, such as surfactant-based microemulsions (Dantas, 2014).

Although microemulsions (MEs) have found several applications in well remediation, stimulation, hydrogen sulfide mitigation (CESI patent, 2003), hydraulic fracturing operations (Pietrangeli et al., 2014), and enhanced oil recovery (EOR) processes (Jeirani et al., 2012), there is a continued need for more effective microemulsion formulations especially for improved oil cleanup and recovery from subsurface geological formations. Unlike wellbore remediation methods, microemulsion flooding or flushing involves more than one well and can sweep a much larger area of the reservoir. Therefore, it is highly dependent on pore space topology and mineral heterogeneity.

SUMMARY OF THE INVENTION

The present invention provides novel microemulsions comprising at least one surfactant, a coupling agent, a carrier fluid, and brine. These novel microemulsions may be used for recovering oil from a subsurface geological formation or for remediation of oil-contaminated aquifers.

DETAILED DESCRIPTION

Figure 1:
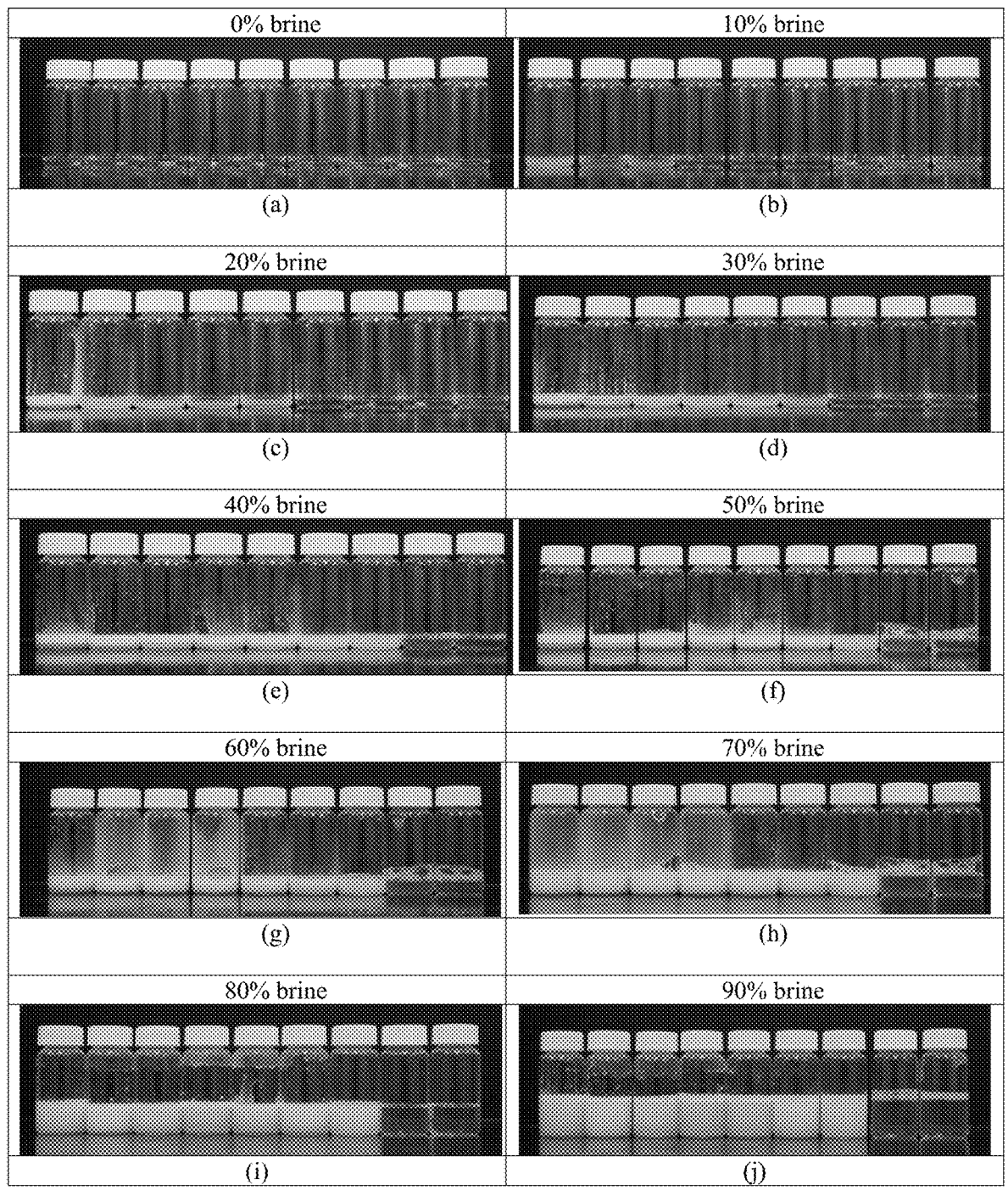
FIG. 1. Phase behavior of surfactant:d-limonene:brine:2-propanol system with increasing brine content: 0%, 10%, 20%, 30%, 40%, 50%, 60%, 70%, 80%, and 90%.

To meet the need for more effective processes for improved oil recovery from subsurface geological formations and aquifer remediation, especially those subsurface geological formations and aquifers containing carbonate cements, new microemulsion formulations and new oil recovery processes were developed and are described below.

The present invention provides a microemulsion comprising: (a) a surfactant or a mixture of surfactants; (b) a coupling agent selected from an alcohol with a $C_3$-$C_{20}$ linear or branched hydrocarbon chain; (c) a carrier fluid; and (d) brine.

The microemulsion formulations of the invention are particularly effective in rocks containing carbonate cements. It has been discovered that they have the ability to recover more oil than would otherwise be recovered by a surfactant alone.

An embodiment of the invention is a microemulsion wherein (a) the surfactant comprises a linear tail or a branched tail and has an hydrophile-lipophile balance (HLB) number between 8 and 18, or (b) the mixture of surfactants comprises at least one surfactant with a linear tail and an HLB number between 8 and 18 and at least one surfactant with a branched tail and an HLB number between 8 and 18.

A further embodiment of the invention is a microemulsion wherein the surfactant has a branched tail and is selected from the group consisting of TRITON X-Series alkylphenol ethoxylates; TERGITOL NP-Series alkylphenol ethoxylates; and TERGITOL TMN-Series secondary alcohol ethoxylates.

A further embodiment of the invention is a microemulsion wherein the surfactant has a linear tail and is selected from the group consisting of BIO-SOFT N-Series primary alcohol ethoxylates; GENAPOL X-Series primary alcohol ethoxylates; TRITON CG-Series alkyl polyglucosides; n-alkyl-β-D-maltosides; and TWEEN Series polysorbates.

A further embodiment of the invention is a microemulsion wherein the mixture of surfactants comprises (a) at least one surfactant with a branched tail selected from the group consisting of TRITON X-Series alkylphenol ethoxylates; TERGITOL NP-Series alkylphenol ethoxylates; and TERGITOL TMN-Series secondary alcohol ethoxylates; and (b) at least one surfactant with a linear tail selected from the group consisting of BIO-SOFT N-Series primary alcohol ethoxylates; GENAPOL X-Series primary alcohol ethoxylates; TRITON CG-Series alkyl polyglucosides; n-alkyl-β-D-maltosides; and TWEEN Series polysorbates.

TRITON X-Series alkylphenol ethoxylate branched tail surfactants include TRITON X-100, TRITON X-102, TRITON X-114, TRITON X-165.

TERGITOL NP-Series alkylphenol ethoxylate branched tail surfactants include TERGITOL NP-6, TERGITOL NP-7, TERGITOL NP-8, TERGITOL NP-9, TERGITOL NP-9.5, TERGITOL NP-10, TERGITOL NP-11, TERGITOL NP-12, TERGITOL NP-13, TERGITOL NP-15.

TERGITOL TMN-Series secondary alcohol ethoxylate branched tail surfactants include TERGITOL TMN-6, TERGITOL TMN-10, TERGITOL TMN-100X.

BIO-SOFT N-Series primary alcohol ethoxylate linear tail surfactants include BIO-SOFT N91-6, BIO-SOFT N91-8, BIO-SOFT N1-5, BIO-SOFT N1-7, BIO-SOFT N1-9, BIO-SOFT N23-6.5, BIO-SOFT N25-7, BIO-SOFT N25-9.

GENAPOL X-Series primary alcohol ethoxylate linear tail surfactants include GENAPOL X-050, GENAPOL X-060, GENAPOL X-080, GENAPOL X-089.

TRITON CG-Series alkyl polyglucoside linear tail surfactants include TRITON CG-50, TRITON CG-110, TRITON CG-650.

n-Alkyl-β-D-maltoside linear tail surfactants include n-octyl-β-D-maltoside; n-nonyl-β-D-maltoside, n-decyl-β-D-maltoside, n-undecyl-β-D-maltoside, n-dodecyl-β-D-maltoside.

TWEEN Series polysorbate linear tail surfactants include TWEEN 20, TWEEN 21, TWEEN 40, TWEEN 60, TWEEN 65, TWEEN 80.

A further embodiment of the invention is a microemulsion wherein the coupling agent is isopropanol.

A further embodiment of the invention is a microemulsion wherein the fluid carrier is d-limonene.

A further embodiment of the invention is a microemulsion wherein the weight ratio of surfactant to fluid carrier to brine to coupling agent is 2:1:1:0.8.

A further embodiment of the invention is a microemulsion wherein the ratio of the surfactant to the coupling agent is between 1:1 and 10:1.

A preferred embodiment of the invention is a microemulsion wherein the ratio of the surfactant to the coupling agent is 2.5:1.

A further embodiment of the invention is a microemulsion wherein the ratio of the surfactant and coupling agent mixture to the carrier fluid is higher than 6:4.

A further embodiment of the invention is a microemulsion wherein the concentration of the surfactant or mixture of surfactants is between 0.05% and 10% by weight.

A further embodiment of the invention is a microemulsion wherein the concentration of the fluid carrier is between 0.01% and 10% by weight.

A further embodiment of the invention is a microemulsion wherein the concentration of the coupling agent is between 0.01% and 10% by weight.

A further embodiment of the invention is a microemulsion wherein the concentration of brine is between 80% and 99.9% by weight.

Another aspect of the invention is a method for recovering oil from a subsurface geological formation, comprising injecting a microemulsion as in claim 1 into the subsurface geological formation.

Another aspect of the invention is a method for aquifer remediation, comprising injecting a microemulsion as in claim 1 into an oil-contaminated aquifer.

Microemulsions are thermodynamically stable, transparent or translucent dispersions, which may be prepared by mixing a solvent-surfactant blend with a carrier fluid.

The mechanism of oil displacement by linear- and branched-tail surfactants is different. Surfactants with branched-chain alkyl groups promote higher IFT reduction, thereby enhancing oil mobilization. Micellar solubilization, on the other hand, is favored by surfactants with linear tails, which are able to align at interfaces and form strong hydrogen bonds that promote asphaltene desorption from rock surfaces.

A carrier fluid increases the mobility of surfactants by reducing their adsorption on mineral surfaces and may include hydrocarbon liquids and natural oils. Preferably, the carrier fluid is a terpene, such as d-limonene, l-limonene, linalool, camphene, borneol, eucalyptol, menthol, thymol, and carvacrol. Most preferably, the carrier fluid is d-limonene.

Solvent-surfactant blends consist of surfactant(s)-in-brine solutions with coupling agents.

A coupling agent stabilizes the microemulsion by increasing the total interfacial area and preventing the formation of liquid crystals and gels. The coupling agent may be an alcohol with a straight or branched $C_3$-$C_{10}$ hydrocarbon chain, including n-propanol, isopropanol, n-butanol, sec-butanol, tert-butanol, pentanol, isopentanol, hexanol, octanol, and monoolein. Most preferably, the coupling agent is isopropanol.

Brine is a solution of one or several salts in water. Brine may comprise sodium chloride (NaCl), sodium bromide (NaBr), sodium iodide (NaI), potassium chloride (KCl), potassium bromide (KBr), potassium iodide (KI), calcium chloride ($CaCl_2$), magnesium chloride ($MgCl_2$), calcium bromide ($CaBr_2$), and calcium iodide ($CaI_2$). Most preferably, brine comprises sodium chloride (NaCl) and/or calcium chloride ($CaCl_2$).

The amount of microemulsion to be injected into a subsurface geological formation or into an oil-contaminated aquifer is based on a variety of factors, including the type and composition of subsurface geological formation or oil-contaminated aquifer; the amount of oil; and the amount of dense nonaqueous phase liquids present in the oil. Thus, the amount of microemulsion to be injected into a subsurface geological formation or into an oil-contaminated aquifer may vary.

EXAMPLES

Example 1—Microemulsion and Surfactant Flooding for Aquifer Remediation

We used X-ray microtomography to conduct micro-scale flow experiments in a NAPL-contaminated heterogeneous aquifer rock and investigate the impact of microemulsions on the pore-scale displacement mechanisms in these rocks through direct measurements of in-situ contact angles and fluid saturations. The test series herein compared the oil cleanup performance of a surfactant solution by itself, and a microemulsion based on the same surfactant.

Materials

Heterogeneous aquifer rock samples were obtained from the Arkose layer of Fountain formation located in east Colorado and Wyoming. An Arkose core sample with 5 mm diameter and 25.4 mm length was drilled from a 1.5 inches diameter core plug. The porosity of the rock was measured after scanning the dry sample and found to be 9.3%. Absolute brine permeability of the core was also measured to be 6 mD. The mineralogy analysis of this heterogeneous rock shows that the dominant minerals are quartz (70%), feldspar (15%), calcite (10%), and dolomite cement (5%).

The NAPL phase was a medium crude oil from Milne Point formation in Alaska. The properties of this oil are provided in Table 1. This oil was selected for its relatively high concentration of nC7-asphaltenes, which are responsible for the wettability alteration of the rock. Because the viscosity of this oil is high, the injection flow rate in the core flooding experiments was chosen to be very low (0.001 cc/min) to avoid viscous-dominated displacement.

TABLE 1

| | |
|---|---|
| Density at 20° C. (g/mL) | 0.9214 |
| Reflective Index at 20° C. | 1.5222 |
| Viscosity (mPa · s) | 112.0 |
| TAN (mg of KOH/g) | 1.69 |
| TBN (mg of KOH/g) | 2.25 |
| TBN/TAN | 1.3 |
| Asphaltenes (wt. %) | 9.03 |
| C (%) | 85.07 |
| H (%) | 7.75 |
| N (%) | 1.09 |
| O (%) | 1.61 |
| S (%) | 4.63 |
| H/C | 1.1 |

The brine was prepared by mixing 1 M $CaCl_2$ in distilled-deionized water with a resistivity of 2.75E04 Ωm. Brine was tagged with 7 wt % NaI to improve the contrast between brine and oil phases in the micro-CT images.

The surfactant selected was a commercial nonionic product, TRITON X-100, suitable for the present invention. This surfactant has a molecular weight of 624 g/mol, an HLB number of 13.5, and a critical micelle concentration (CMC) of 0.01. In all the tests, the concentration of TRITON X-100 in brine was set to 0.2 wt %, which is more than one order of magnitude above its CMC.

Figure 2:
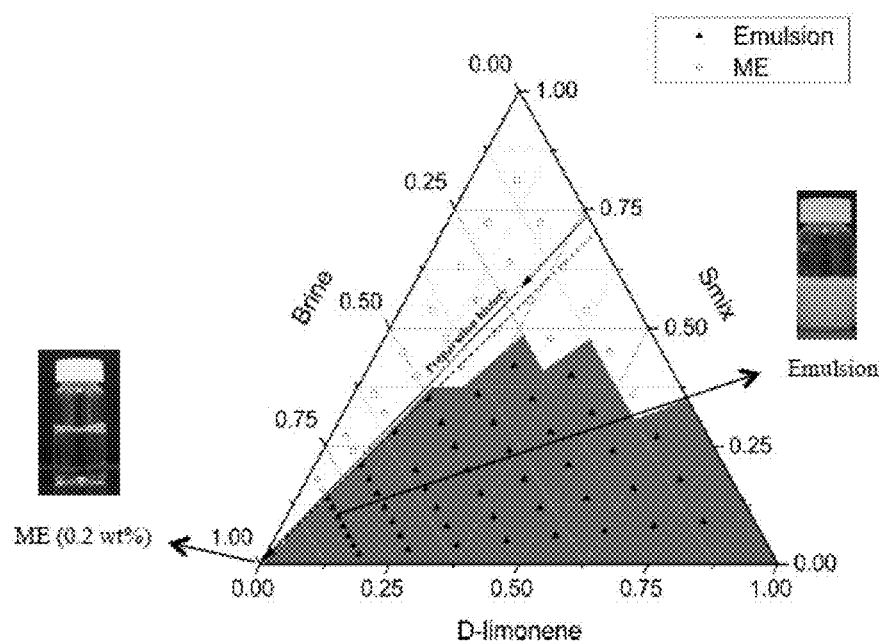
FIG. 2. Pseudo-ternary phase diagram of TRITON:d-limonene:brine:2-propanol system.

The microemulsion phase contained TRITON X-100 as the surfactant, isopropanol as the coupling agent, and d-limonene as the fluid carrier. The optimum weight ratio of these components was determined through bottle tests of various TRITON:d-limonene:brine:2-propanol mixtures (FIG. 1). In these tests, a TRITON X-100:isopropanol mixture ($S_{mix}$) was first prepared at a fixed weight ratio of 2.5:1. This blend was then added to d-limonene at $S_{mix}$:d-limonene weight ratios of 1:9, 2:8, 3:7, 4:6, 5:5, 6:4, 7:3, 8:2, and 9:1 (FIG. 1(a) from left to right). Finally, the resulting mixtures were diluted in 1 M $CaCl_2$ brine to concentrations of 10%, 20%, 30%, 40%, 50%, 60%, 70%, 80%, and 90% brine by weight. The emulsions with a low $S_{mix}$:d-limonene ratio (1:9, 2:8, 3:7, 4:6, 5:5) became cloudy or milky white when brine content reached 20% (FIG. 1(c)). The emulsions with a high $S_{mix}$:d-limonene ratio (7:3) were also cloudy when brine content reached 40% brine. It was discovered that stable and colorless microemulsions formed only when $S_{mix}$:d-limonene ratio was higher than 7:3 (FIG. 1(j)). A pseudo-ternary phase diagram is presented in FIG. 2 to illustrate the preparation of these microemulsions. Therefore, the optimum weight ratio of TRITON X-100:d-limonene:brine:isopropanol was set to 2:1:1:0.8. The microemulsion phase was further diluted in brine to a concentration of 0.48 wt %. The final solution contained 0.2 wt % of TRITON X-100, 0.1 wt % of d-limonene, 0.08 wt % of isopropanol, and 99.62% of brine.

Experimental Procedure

Micro-scale flow experiments were performed with a three-phase miniature core flooding system integrated with VERSA-XRM50 x-ray micro-CT scanner from Zeiss. The NAPL and brine phases were injected through the bottom of the core using two pulse free programmable dual-cylinder Quizix pumps at constant flow rate. The productions were received from the top of the core at constant pressure and were discharged into a beaker. Another Quizix pump was used to maintain the overburden pressure on the rubber sleeve inside the high-pressure miniature core holder. Certain locations of the core were scanned at micron resolution during the flow experiments. A resolution in the range of 700 nm to 64 μm was within reach based on the x-ray source voltage and exposure time, which were tuned to minimize the noise and maximize the quality of the images during each flow cycle.

At the start of experiments, the core sample was vertically placed in a carbon fiber core holder and kept under an initial confining stress of 200 psi. Air was then removed from the system by injecting $CO_2$, which was later removed by vacuuming the system for several hours. Reference scans were collected by scanning the core with a resolution of 2.2 μm. The vacuumed core sample was then fully saturated with brine by injecting several pore volumes of brine and subsequently increasing pore pressure to ensure that all the trapped $CO_2$ would be dissolved in the brine phase. The doped brine (7 wt % NaI) was then injected into the medium. An absolute permeability of 6 mD was measured based on the steady-state pressure drop method performed at a constant flow rate.

Drainage and water flood tests were then performed with an unsteady-state method. First, a drainage test with a flow rate of 0.001 cc/min was carried out until the brine saturation became constant. Meanwhile, enough time was allowed for asphaltene adsorption on the rock surface. Subsequently, a water flood test was performed with a flow rate of 0.001 cc/min. During each test, an approximate saturation was measured using lower resolution (10 μm) images after the pressure drop reached a stable value. During this stage, fluid occupancy in the medium was monitored repeatedly until no additional displacement was observed. After the steady state condition was established, the core was scanned at the desired location at a higher resolution (2.2 μm). At the end of the water flood, chemical flooding was performed by injecting the surfactant or microemulsion solution at a flow rate of 0.001 cc/min. All flow tests were carried out at ambient conditions. Only one phase at a time was injected into the core.

During the experiments, a location in the middle of the core sample (12 mm offset from inlet of the core) was selected for scanning at high resolution (2.2 micron) during the flow cycles. Fluid occupancy maps obtained from micro-CT images were used to investigate the pore-scale displacement physics that controls multiphase flow through the medium. The tomography files obtained from the micro-CT were reconstructed using XMReconstructor software to provide TXM files. Using these files, fluid occupancy maps were generated, in-situ contact angles (CAs) were measured directly, and two-phase flow physics was studied.

Primary Drainage and Waterflooding

Figure 3A:
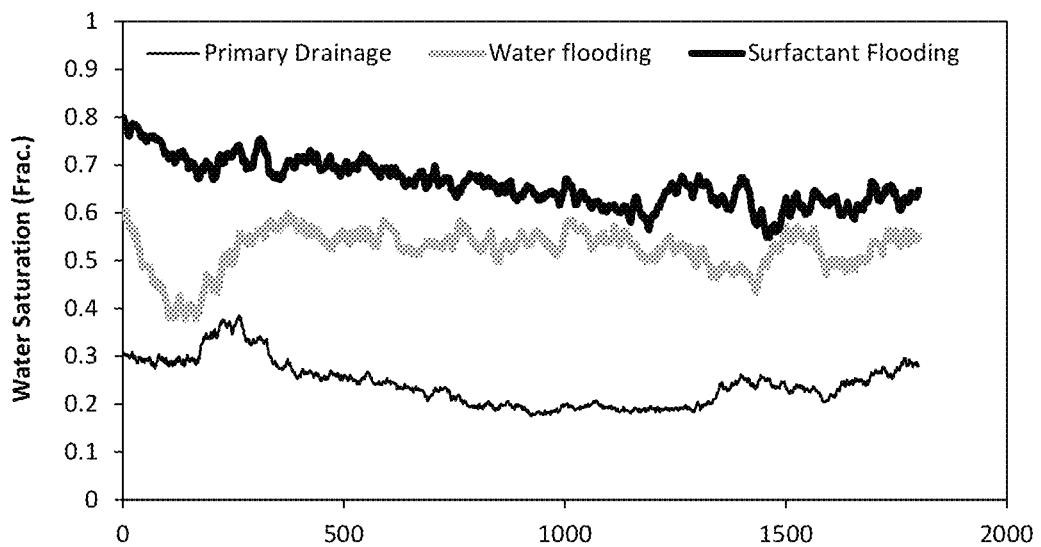
FIG. 3A. Saturation profile at the end of three flow cycles in Example 1: surfactant flooding.
Figure 3B:
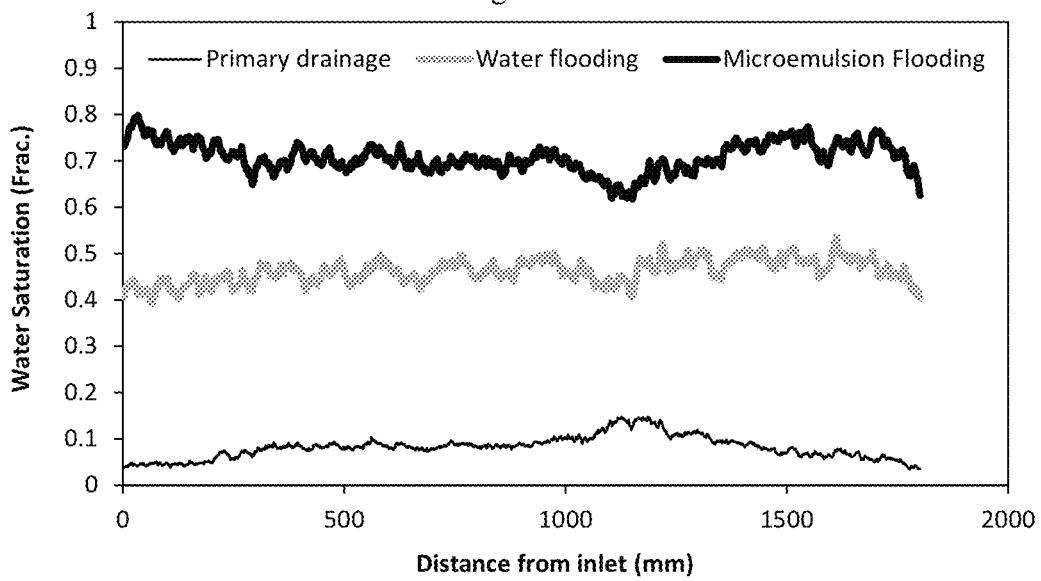
FIG. 3B. Saturation profile at the end of three flow cycles in Example 1: microemulsion flooding.
Figure 4A:
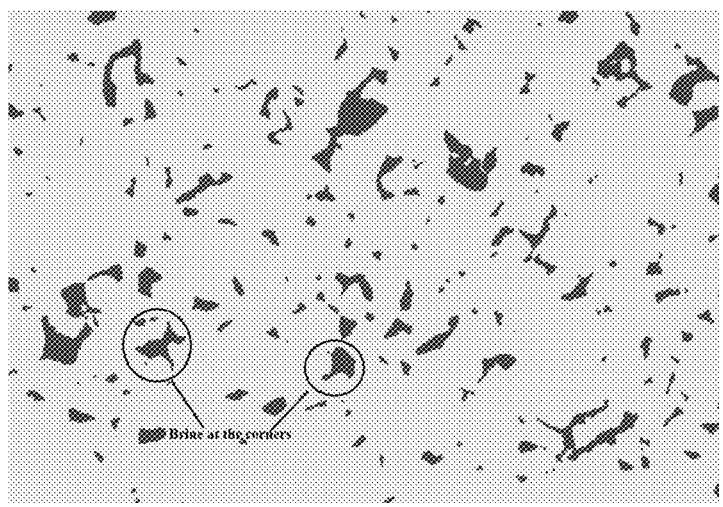
FIG. 4A. 2D cross-section of the pore space after primary drainage.

First, primary drainage was performed by injecting NAPL to 100% water-saturated core sample (light black line in FIG. 3). The system reached steady-state condition after 4 days and an average of 23% initial water saturation was established. FIG. 3 shows the water saturation profile along the scanned location at the end of each flow cycle. Piston-like NAPL-displacing-brine process starts with larger pores and eventually fills up the smaller pores as well. FIG. 4(a) shows a two-dimensional (2D) cross-section of the pore space at the end of primary drainage. NAPL inside the pores is well connected and most of the brine fraction remained in the corner of pores. Wettability alteration by asphaltene adsorption is a kinetic process, which occurs in pores occupied by NAPL.

Figure 4B:
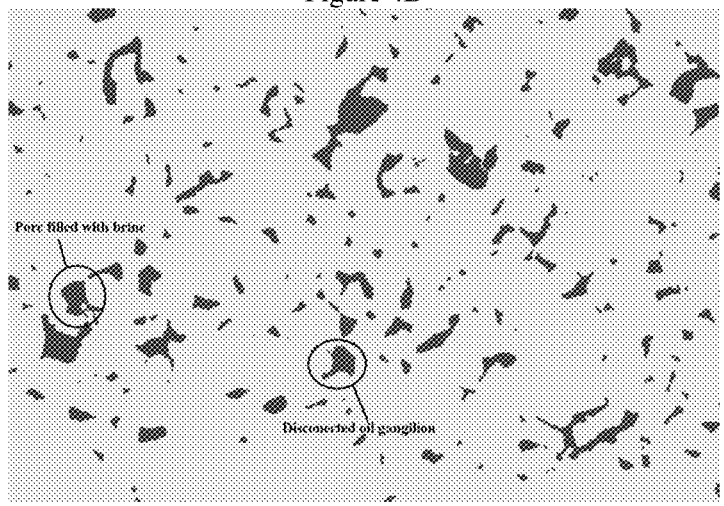
FIG. 4B. 2D cross-section of the pore space after water flooding.

Next, water flooding with doped brine was carried out to reach an average remaining oil saturation of about 50%. The injection flow rate was set to 0.001 cc/min to develop a capillary-dominated displacement with a capillary number of $10^{-8}$. After 4 days, the pressure gradient along the core stabilized and high-resolution scans were started to capture the fluid occupancy maps. FIG. 4(b) shows a 2D cross-section of the pore space at the end of water flooding. During water flooding, NAPL snap-off may take place in addition to piston-like displacement. In this case, some NAPL that was occupying the center of water-wet pores (CA<60°) may disconnect from the rest of the NAPL phase. This NAPL represents trapped oil that cannot be displaced using conventional water flooding or pump and treat techniques. As the rock becomes more oil-wet due to asphaltene adsorption, snap-off becomes less favorable, causing the NAPL residual saturation to decrease. However, when the rock becomes (weakly) oil-wet, the capillary pressure becomes negative, requiring water pressure greater than NAPL pressure to displace NAPL. Therefore, water cannot invade the pores with large negative capillary pressures. In turn, NAPL removal is reduced as water bypasses these pores.

FIG. 3 shows the saturation profiles at the end of water flooding (bold gray line). After reaching to water saturation of about 50%, no additional NAPL would be removed by brine displacement if the water flood test were continued. Micro-CT images also show that brine could not dissolve asphaltenes from rock surfaces. However, most of the displaced NAPL occurred in smaller pores because brine film covered most of the surface in these pores. Therefore, the wettability of small pores was not completely altered and, in large pores, brine remained in the corners.

Chemical Flooding

After reaching a residual NAPL saturation of about 50%, chemical flooding was started with the same flow rate of 0.001 cc/min. The sample was scanned along the core and fluid saturations were measured after each day until steady state conditions were reached. The bold black lines in FIG. 3 provide the water saturation profile after 4 days and indicate that the residual NAPL saturation in the core reduced to about 24% after microemulsion flooding (FIG. 3(b)), which was 11% more than surfactant flooding (FIG. 3(a)).

Figure 5A:
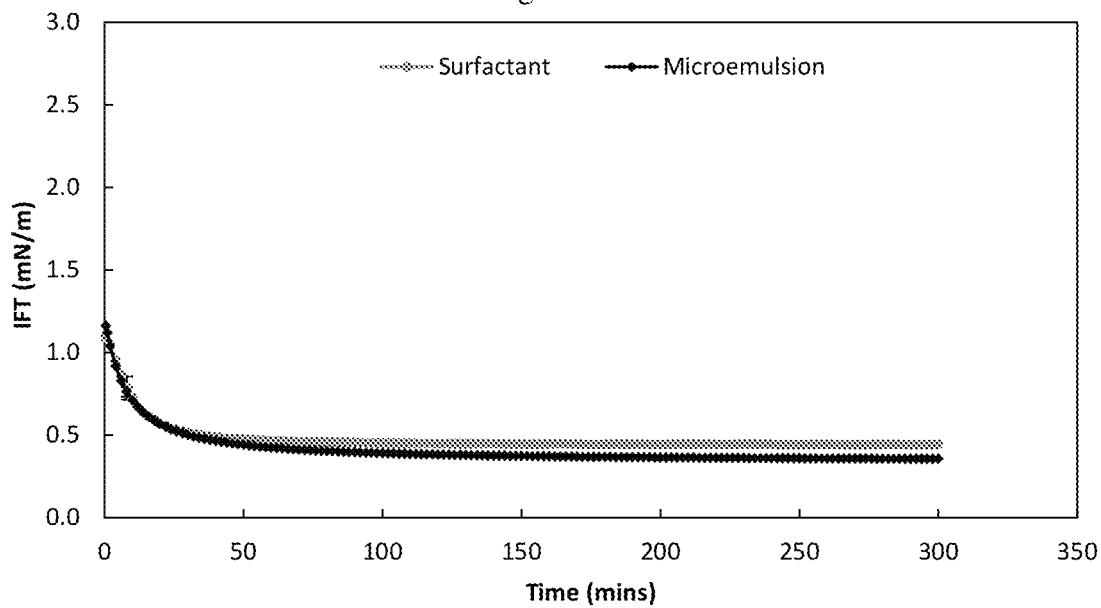
FIG. 5A. Impact of chemicals on the dynamic IFT at the three-phase contact line of main Arkose minerals.
Figure 5B:
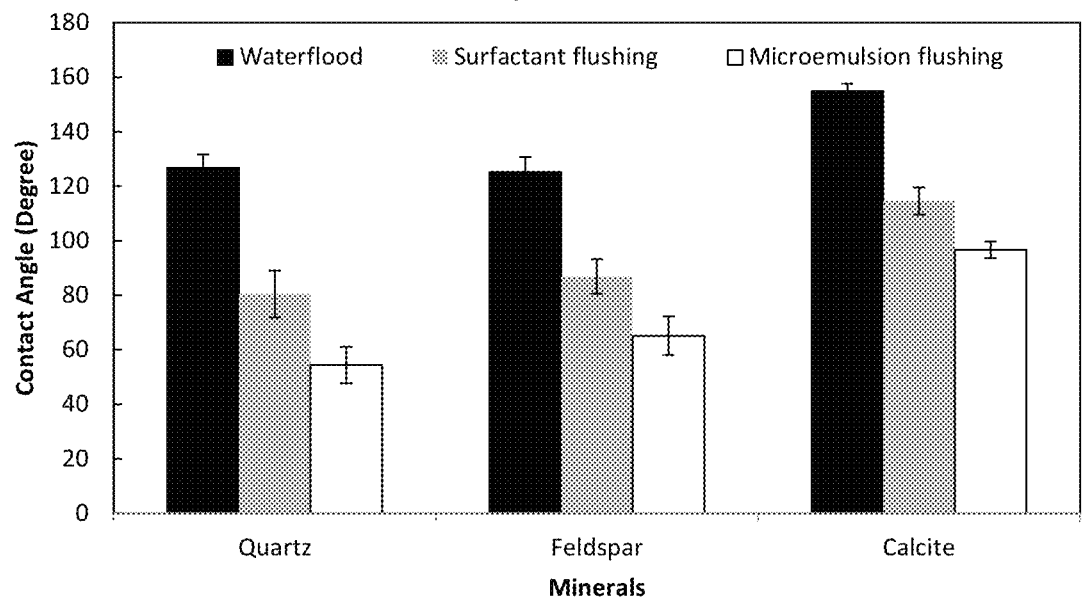
FIG. 5B. Impact of chemicals on in-situ static contact angle at the three-phase contact line of main Arkose minerals.
Figure 6A:
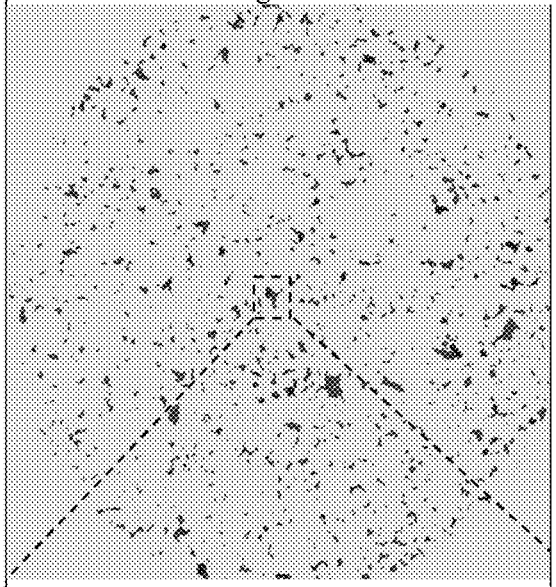
FIG. 6A. 3D visualization of a pore at the end of water flooding.
Figure 6B:
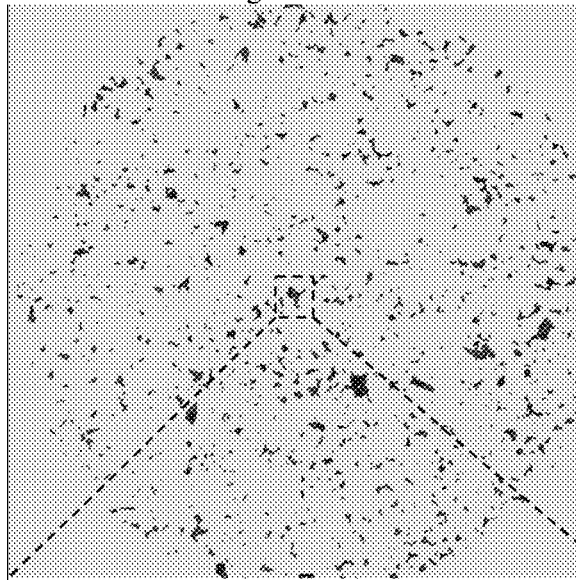
FIG. 6B. 3D visualization of a pore at the end of microemulsion flooding.

Both chemicals decreased the interfacial tension (IFT) between NAPL and brine to about 0.3-0.4 mN/m (FIG. 5(a)), which resulted in an increase in the capillary number to $10^{-7}$, thereby promoting more NAPL mobilization. However, microemulsions could restore the wettability of minerals to a higher extent than surfactants alone. FIG. 5(b) shows that the in-situ CA on minerals predominantly found in Arkose reduced by 40-50° after surfactant flooding (gray columns) and 50-60° after microemulsion flooding (white columns). This is due to the fact that microemulsions can easily penetrate sharp corners where NAPL ganglia are attached and detach them, promoting their mobilization to the center of the pore (FIG. 6).

Figure 7A:
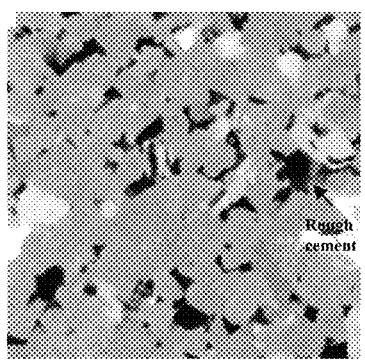
FIG. 7A. 2D cross-section of pore space: dry sample.
Figure 7A:
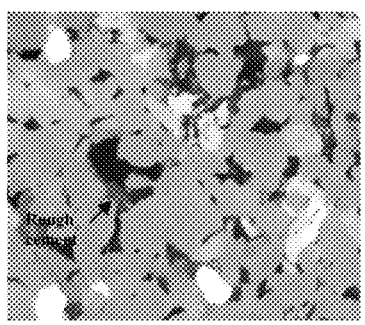
Figure 7B:
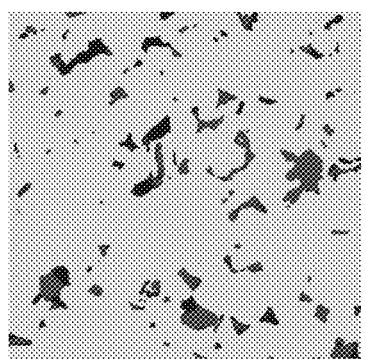
FIG. 7B. 2D cross-section of pore space after water flooding.
Figure 7B:
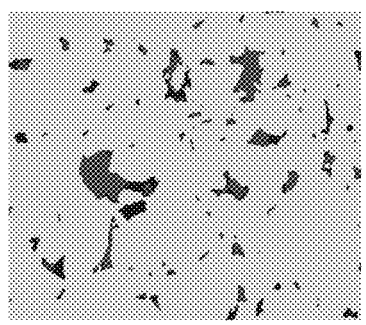
Figure 7C:
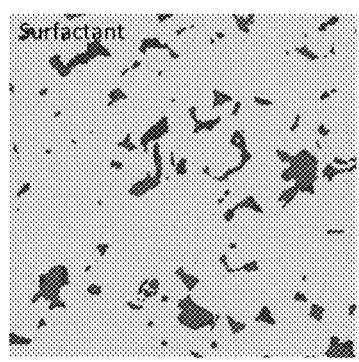
FIG. 7C. 2D cross-section of pore space after chemical flooding.
Figure 7C:
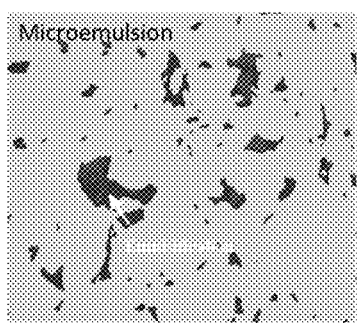

More importantly, microemulsions can also penetrate rough areas such as carbonate cement. The images in FIG. 7(a) represent non-segmented dry samples containing smooth and rough mineral surfaces together with dolomite cement. After water flooding, a large portion of NAPL remained trapped inside the pores (FIG. 7(b)) and surfactant solutions could only solubilize asphaltenes from smooth surfaces, as seen in the upper image of FIG. 7(c). Microemulsions, on the other hand, were able to clean up both smooth and rough surfaces, including dolomite cement. This cement has a relatively high surface roughness and microporosity and can therefore trap more asphaltenes, which are not accessible to surfactant molecules. The presence of a carrier fluid such as d-limonene makes it easier for surfactant molecules to penetrate these structures and solubilize asphaltenes. The solubilization process generated very small NAPL droplets that could easily penetrate pores and throats and be mobilized by microemulsions, as seen in the lower image of FIG. 7(c). These phenomena may have contributed to reconnecting trapped NAPL globules and improving their removal. In addition, NAPL was displaced to some of the pores that had been occupied by brine at the end of water flooding.

Example 2—Microemulsion and Surfactant Flooding for EOR

We used an outcrop and a heterogeneous reservoir rock to demonstrate the dependence of microemulsion performance on surface mineralogy, roughness, and wettability state of oil-bearing rocks. The goal was to identify the test conditions in which microemulsions outperform surfactants alone.
Materials The rocks consisted of Berea sandstone and reservoir sandstone from Tensleep formation in Wyoming. The rocks were drilled and cut into small cores 1 inch in diameter and 5 cm in length. Berea cores were baked at 110° C. for 24 hours to remove any water. Tensleep cores were first cleaned by flooding them with a 50/50 volume mixture of toluene/methanol at 1000 psi and 80° C. until the produced solution was colorless, then baked at 120° C. for 24 hours in a constant temperature oven to remove the solvents. The porosity and Klinkenberg-corrected permeability of these core samples were measured simultaneously by an automated porosimeter and permeameter. The porosity was 19.8-21.6% for Berea and 10.3-18.6% for Tensleep. The permeability was 246.4-272.8 mD for Berea and 16.2-47.2 mD for Tensleep.

Figure 8A:
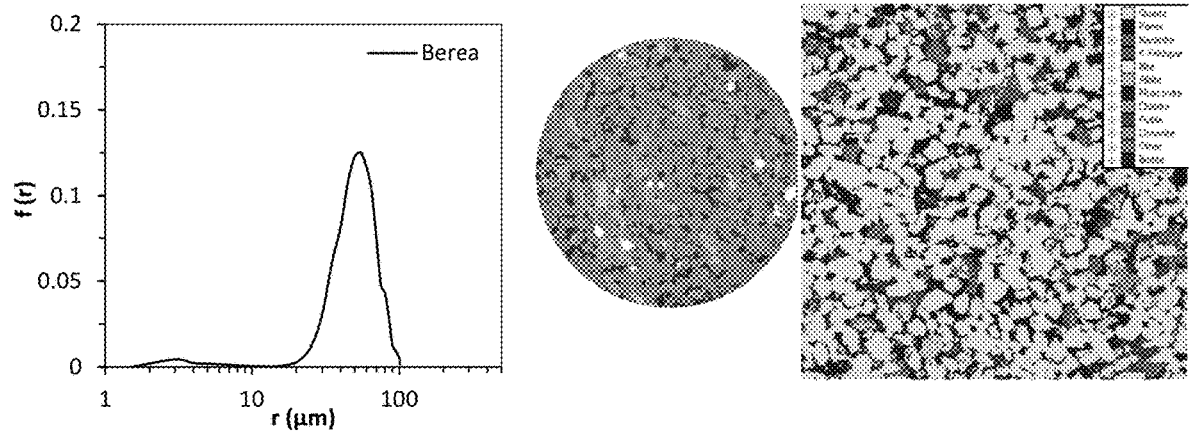
FIG. 8A. Pore size distribution (left), micro-CT image of core cross-section (center), and mineralogy map (right) of Berea sandstones.
Figure 8B:
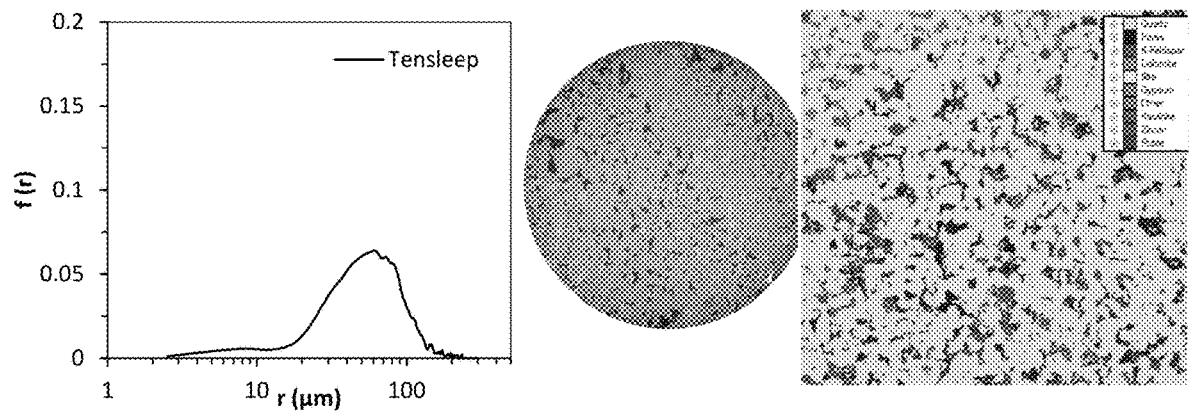
FIG. 8B. Pore size distribution (left), micro-CT image of core cross-section (center), and mineralogy map (right) of Tensleep sandstones.

The mineralogy analysis of these rocks shows that Berea contains of 85% of quartz, 4% of feldspar, and 11% of clay minerals. Tensleep contains about the same fractions of quartz and feldspar than Berea and 4% of clays. However, in contrast to Berea, some of the pores in Tensleep are filled with gypsum/anhydrate (3%) and most of the pores contain dolomite microcrystals (4%), as seen in the mineralogy map of FIG. 8. These microcrystals can change the mineralogy of the pore surface and increase its roughness, thereby affecting wettability and fluid flow in the porous rock. FIG. 8 also displays the micro-CT images of these rocks. Berea is a fine-grained, well sorted, and well-rounded sandstone. Its pore size distribution has two peaks, which represent their average pore and throat sizes. The average pore and throat sizes of Berea are about 55 μm and 3 μm. Tensleep has fine to medium, subrounded detrital quartz grains that are embedded in a pervasive microcrystalline dolomite cement, seen here as white particles inside the pores. These cements enhance the roughness of grain surfaces, in agreement with the mineralogy map. Abundant gypsum/anhydrite patches or stripes are also distributed in the rock with almost no porosity. This matrix heterogeneity is a result of variation in lithologies, depositional structures, and diagenetic modifications. Tensleep has the widest pore size distribution, which indicates that there is a large amount of big and small pores available in this rock. The average pore size of Tensleep is about 60 μm.

The crude oil consisted of a medium oil from Tensleep formation in Wyoming. The properties of this oil are provided in Table 2. Tensleep oil was first centrifuged at 6000 rpm for one hour and then filtered with 0.5 μm filter.

TABLE 2

| | |
|---|---|
| Density at 20° C. (g/mL) | 0.8684 |
| Reflective Index at 20° C. | 1.4876 |
| Viscosity (mPa · s) | 14.3 |
| TAN (mg of KOH/g) | 0.16 |
| TBN (mg of KOH/g) | 0.96 |
| TBN/TAN | 6.0 |
| Asphaltenes (wt. %) | 3.2 |
| C (%) | 85.48 |
| H (%) | 7.00 |
| N (%) | 0.66 |
| O (%) | 1.88 |
| S (%) | 4.96 |
| H/C | 1.0 |

The brine phase consisted of 0.1 M NaCl in distilled water.

An environmentally friendly surfactant, BIO-SOFT N25-9, was added to brine to prepare surfactant solutions at high (3.3 wt %) and low (0.3 wt %) concentrations. This surfactant has a molecular weight of 597 g/mol, an HLB number of 13.3, and a CMC of 0.02.

Figure 9:
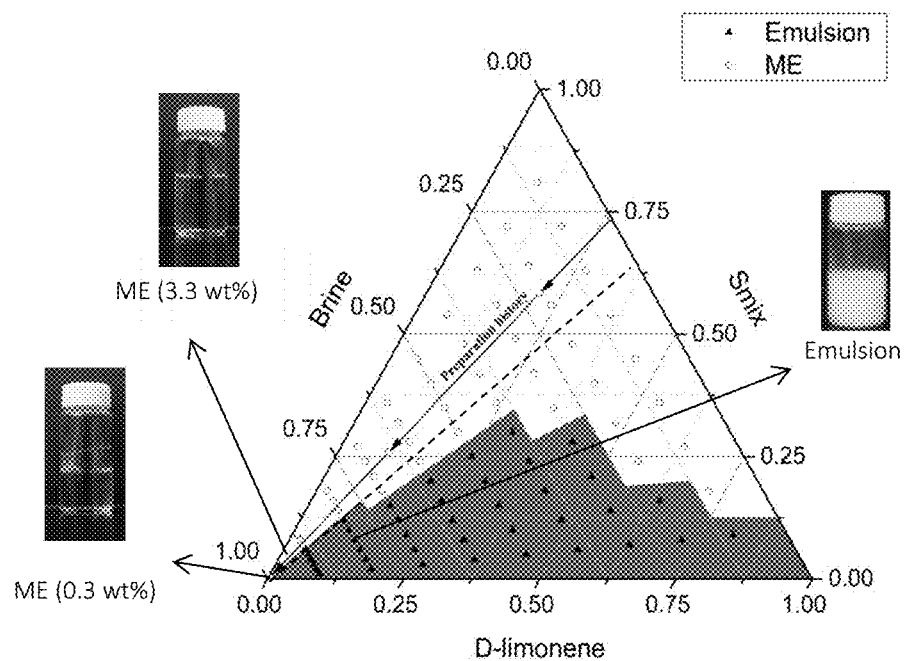
FIG. 9. Pseudo-ternary phase diagram of N25-9:d-limonene:brine:2-propanol system.

Microemulsions were formed by mixing BIO-SOFT N25-9, d-limonene, brine, and 2-propanol at a specific weight ratio of 2:1:1:0.8, similar to Example 1. FIG. 9 presents the pseudo-ternary phase diagram of this system where the solid arrows indicate the path of microemulsion dilution in brine until the desired surfactant concentrations were reached. The surfactant:2-propanol ratio was fixed at 2.5:1. When $S_{mix}$ to d-limonene ratio was lower than 6:4 (area below dashed line), oil-in-water (o/w) emulsions formed and extended over a wide area with increasing water content. The size of emulsions was large enough to scatter light and as such they appeared as cloudy milky white colloidal solutions. Conversely, when $S_{mix}$ to d-limonene ratio was higher than 6:4 (area above dashed line), transparent MEs were obtained. The high concentration of $S_{mix}$ contributed to a lower IFT and higher emulsification ability, which could promote the formation of microemulsions. Following this procedure, two microemulsion solutions were prepared: (i) one at 8.8 wt % concentration containing 3.3 wt % surfactant, 1.67 wt % d-limonene, 1.33 wt % isopropanol, and 93.67 wt % brine, and (i) another one at 0.8 wt % concentration containing 0.3 wt % surfactant.

Figure 10:
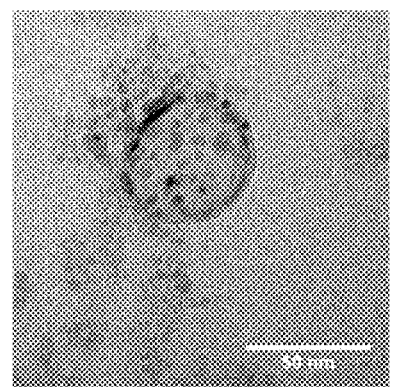
FIG. 10. HRTEM micrograph of 0.8 wt % microemulsion in brine.

The structure of these microemulsions was visualized with Tecnai TF20 S-Twin High Resolution Transmission Electron Microscope (HRTEM) from FEI under 220 kV bright field. MEs were carefully transferred on silicon dioxide coated carbon TEM grids (SPI supplies) and dried overnight before the imaging process. ImageJ software was used for image analysis. HRTEM micrographs of low microemulsion concentration are presented in FIG. 10. The average size of d-limonene droplets was about 90 nm. The dark layers around these droplets represent surfactant molecules adsorbed at d-limonene/brine interfaces. There was a large fraction of small surfactant micelles in the solution with an average diameter of 3.3 nm.

Experimental Procedure

The IFT between brine and Tensleep oil was measured by the pendant drop and rising/captive bubble tensiometry with video-image digitization technique at low surfactant concentration and by spinning drop tensiometry at high surfactant concentration.

In order to estimate the oil drop size distributions in brine solutions, oil and brine (50/50 volume ratio) with different additive concentrations were mixed for 5 hours at a speed of 500 rpm. The rag layers formed between these phases were diluted 20 times in the same brine solutions to enhance their transparency to light, then immediately transferred into cuvettes. A particle sizer and zeta potential analyzer was used to measure the droplet size of emulsions via dynamic light scattering (DLS) technique. Each measurement was conducted for 1 minute and repeated at least 5 times to reduce experimental error. ZetaPlus Particle Sizing Software was used to analyze the droplet size distribution of these emulsions.

Measurements of the static contact angle of oil/water/rock systems were performed using an IFT/CA apparatus. The rock substrates were first vacuumed at $10^{-7}$ psi for 12 hours and then immersed in oil. After aging in oil for 14 days at 60° C., they were gently placed in the IFT/CA cell. Brine (with and without additives) was then transferred to the cell until the substrates were fully immersed. The oil inside the substrates formed several small oil bubbles on the surface of the rock, as it was released by spontaneous imbibition of brine. The images of oil bubbles were taken after 24 hours and analyzed by ImageJ software to estimate the contact angles.

For the spontaneous imbibition tests, the cores were first vacuumed at $10^{-7}$ psi for 12 hours. Oil was then injected into the vacuum cell to saturate the cores for 24 hours. The cores were aged in Tensleep oil at 60° C. for 14 days. After the aging process, the cores were weighed, placed in Amott cells, and then immersed in different brine solutions (0.1 M NaCl, 0.3 wt % surfactant, 3.3 wt % surfactant, 0.3 wt % ME, and 3.3 wt % ME). The produced oil was recorded in time until recovery was complete.

In order to analyze rock wettability after the spontaneous imbibition tests with different solutions, three sets of petrographic thin sections of the three different rocks were prepared by Wagner petrographic company. The thin sections of clean Edwards, Berea and Tensleep were also provided as a reference. The size of the thin sections was 46×24 mm. Blue epoxy impregnation, K-feldspar stain, plagioclase stain and calcite stain were applied on the thin sections. A petrographic microscope with AXIO vision software was used for visualization of thin sections.

Interfacial Tension, Oil Size Distribution, and Wettability

Figure 11A:
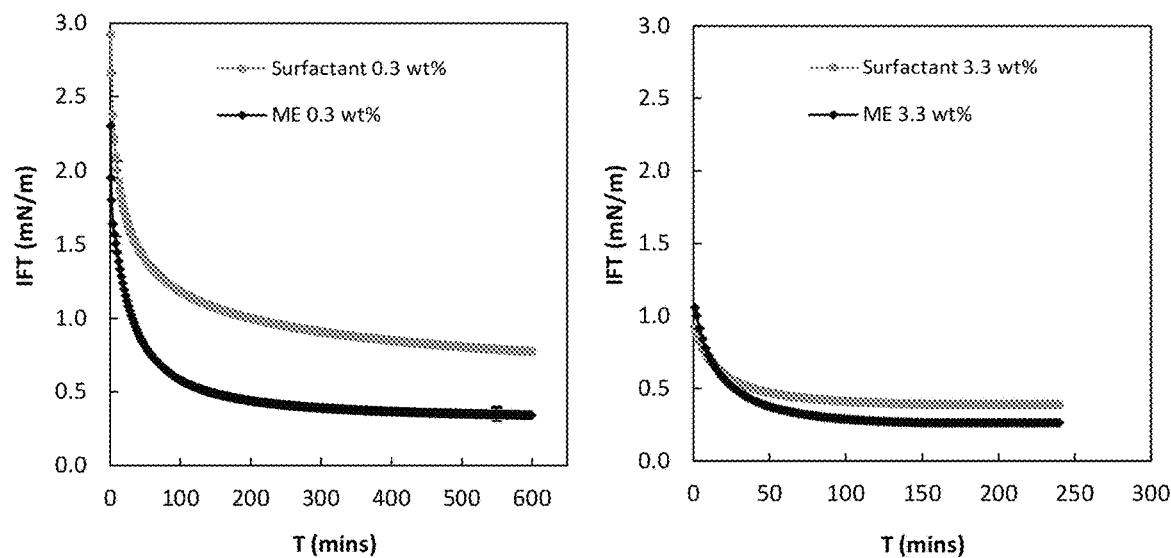
FIG. 11A. Dynamic interfacial tension at low (left) and high (right) surfactant and microemulsion concentration in brine.
Figure 11B:
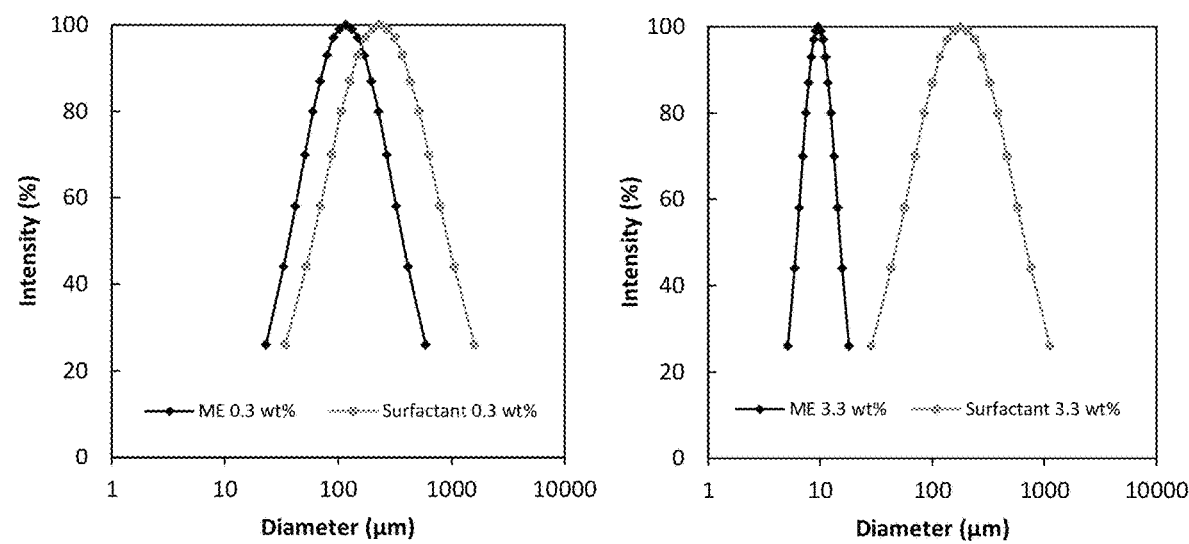
FIG. 11B. Drop size distribution at low (left) and high (right) surfactant and microemulsion concentration in brine.

Two microemulsion concentrations were used: 8 wt % ME (containing 3.3 wt % of surfactant), and 0.8 wt % ME (containing 0.3 wt % of surfactant). Surfactant solutions in brine (0.3 and 3.3 wt %) were also tested for comparison. Without any additive, the IFT between oil and brine was about 11.8 mN/m. It sharply decreased to 0.8 mN/m and 0.3 mN/m upon the addition of low surfactant and ME concentration, respectively (FIG. 11(a)). The 2-propanol molecules in ME could partition between the brine and oil phases and behave in many respects like nonionic co-surfactants, further reducing the IFT. At high concentration, IFT reached equilibrium within the first 100 minutes to stabilize at 0.39 and 0.26 mN/m with surfactant and ME, respectively. Although the difference between these low IFT values was rather small, it had a large impact on the size of oil droplets (FIG. 11(b)). The average oil drop sizes generated by low additive concentration were similar and in the 100-200 μm range. However, drops at high additive concentration (D=9.2 μm) were less polydisperse and one order of magnitude smaller than those formed by high surfactant concentration (D=156 μm). While concentration did not affect drop sizes in surfactant solutions since it was above their CMC, it had a significant impact in microemulsions. At high concentration, the amount of limonene and 2-propanol in ME was large enough to significantly reduce the size of these droplets.

Figure 12A:
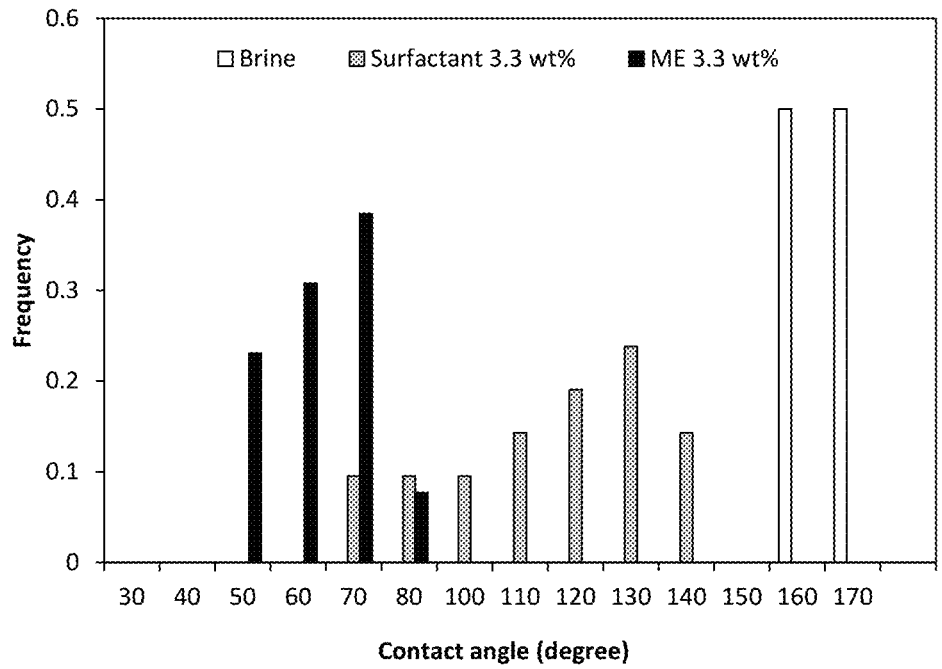
FIG. 12A. Contact angle of 0.1 M NaCl brine, surfactant and ME on 14 day-aged rocks: angle distribution on Tensleep at high surfactant and ME concentration.

Berea and Tensleep rocks contain predominantly quartz that is water-wet prior to contact with oil. The contact angle of brine on this mineral is about 50°. However, when these rocks were aged in oil for 14 days at 60° C., their contact angle increased as they became more oil-wet due to asphaltene adsorption. Tensleep exhibited the highest wettability alteration with a CA of 150°, compared to 114° in Berea. The effect of surfactant and ME on wettability alteration of Berea and Tensleep was investigated in FIG. 12 at high concentration. The CA data show that both surfactant and ME restored the wettability of aged Berea substrates from weakly oil-wet to water-wet, with a contact angle of 66° and 49°, respectively. The high performance of MEs was likely due to the ability of d-limonene to penetrate adsorbed asphaltene layers and reduce the overall percentage of polar components, leading to easier removal. The contact angle on 14 day-aged Tensleep substrates decreased considerably from 150° to 57° upon the addition of high ME concentration. Unlike Berea, the surfactant ability to alter the wettability of Tensleep rock was somehow limited. Indeed, the rock surface was still neutral-wet after the addition of high surfactant concentration, with a contact angle decrease of only 40° (FIG. 12(b)). FIG. 12(a) reveals that the contact angle distribution with surfactant alone spans over a wide range of values (i.e., from 70° to 140°). In other words, a small fraction of Tensleep rock became water-wet while a large fraction remained neutral-wet or oil-wet. By comparison, the contact angle distribution with ME is narrower and ranges from 50° to 80°, indicating that the wettability of a large fraction of the rock has been restored to its water-wet condition. The main difference between Tensleep and Berea is the presence of dolomite microcrystals throughout the pores (FIG. 8). These rough microcrystalline cements may make it harder for surfactant alone to solubilize oil from their surfaces.

Figure 12B:
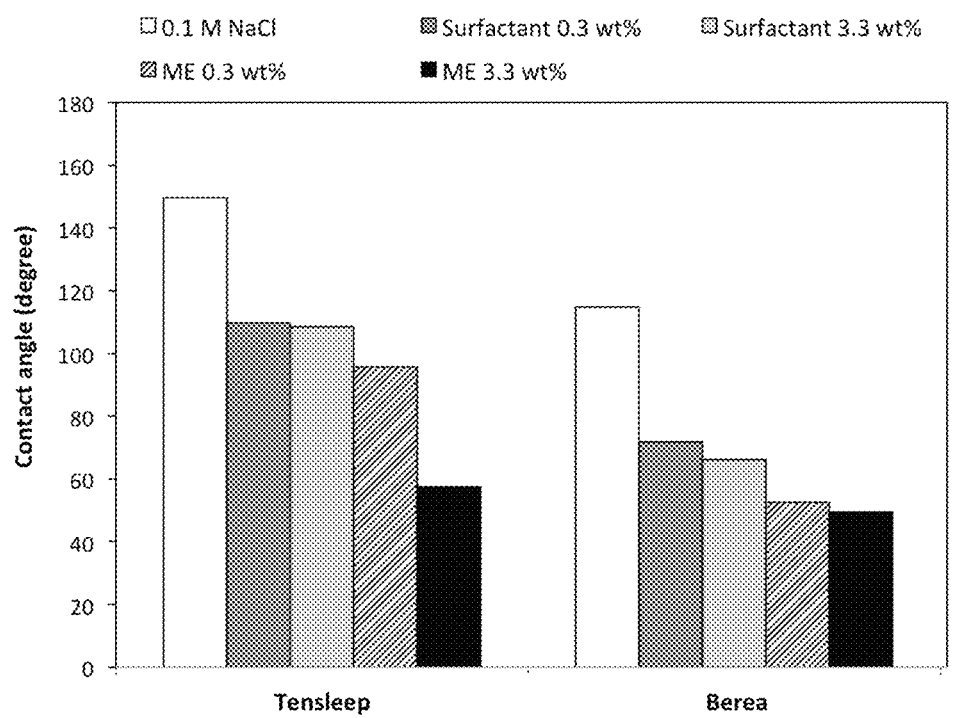
FIG. 12B. Contact angle of 0.1 M NaCl brine, surfactant and ME on 14 day-aged rocks: average angle on Berea and Tensleep at different surfactant and ME concentrations.
Figure 13A:
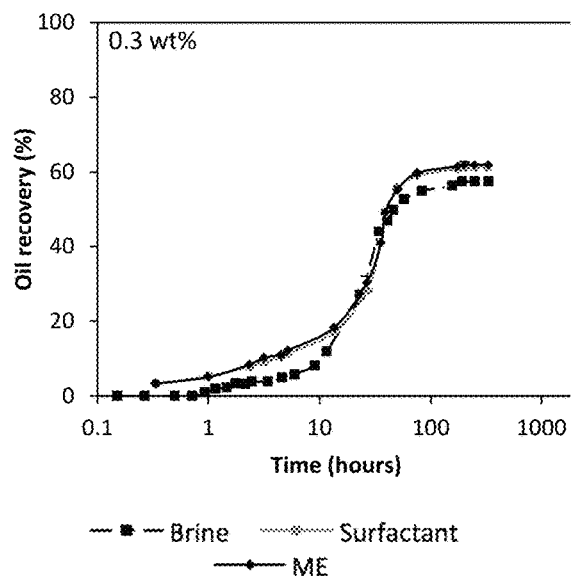
FIG. 13A. Spontaneous imbibition of low (left) and high (right) surfactant and ME concentration with 14 day-aged Berea.
Figure 13B:
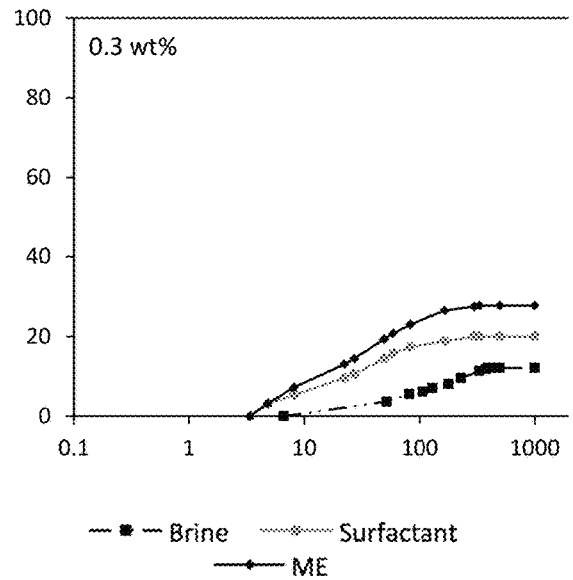
FIG. 13B. Spontaneous imbibition of low (left) and high (right) surfactant and ME concentration with 14 day-aged Tensleep.
Figure 13B:
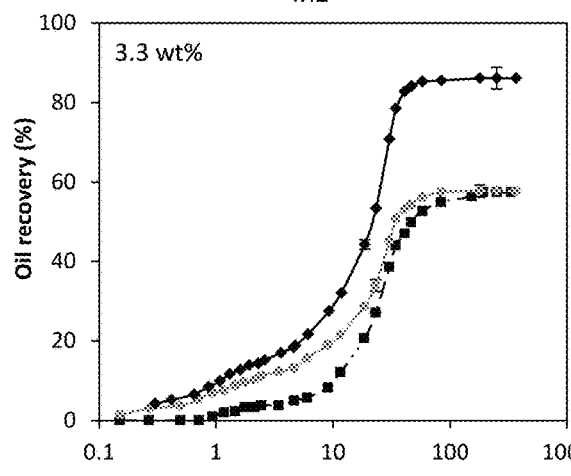
Figure 13B:
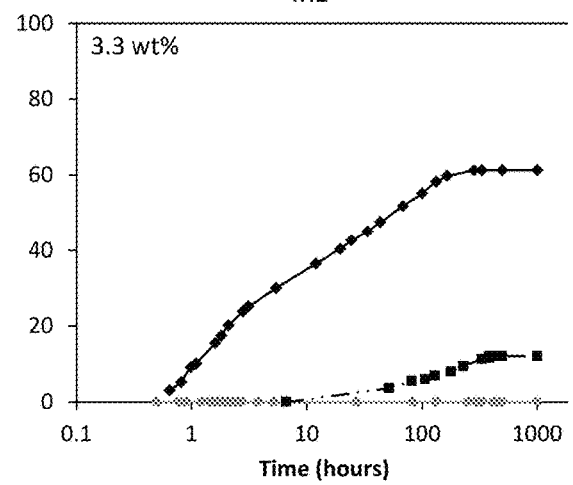

To further understand the effect of ME on wettability alteration, the contact angles of MEs and surfactant solutions with different surfactant concentrations (i.e., 0.3 and 3.3 wt %) on 14 day-aged rocks were included in FIG. 12(b). Concentration had little effect on the wettability of Berea, indeed both low and high surfactant and ME concentrations altered the wettability of Berea from oil-wet to water-wet. In contrast, increasing concentration in surfactant solutions did not affect the neutral wettability of Tensleep, since the contact angles on dolomite cement could only be altered by microemulsions. By increasing surfactant concentration in MEs, we are also increasing the amount of d-limonene and therefore the ability of this phase to penetrate and swell the adsorbed oil layers, further altering rock wettability from 96° to 57°.

Spontaneous Imbibition

Spontaneous imbibition tests with brine, microemulsions and surfactant solutions were conducted on Berea and Tensleep rocks to investigate the performance of MEs. The rocks were aged in oil for 14 days at 60° C. in a closed container and then placed in Amott imbibition cells filled with brine, MEs or surfactant solutions with a surfactant concentration of 0.3 wt % and 3.3 wt %. The volume of oil produced from the cores during spontaneous imbibition was recorded for at least 30 days until no more oil was produced.

At low concentration, the performance of surfactant and ME was very similar in Berea but differed in Tensleep (top FIG. 13). At this concentration, the amount of limonene and 2-propanol in ME was not large enough to reduce the size of oil droplets compared to surfactant alone (FIG. 11(b)). As a result, the amount of oil mobilized by surfactant and ME was comparable and equal to 62% in Berea. The variations seen in Tensleep were mainly attributed to the unique ability of MEs to solubilize oil from carbonate cements. Overall, ME could recover 28% of oil from Tensleep, which was 7% higher than surfactant alone and 16% higher than brine.

Figure 14A:
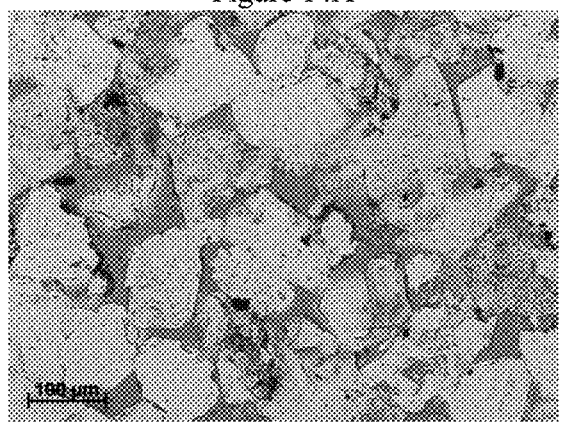
FIG. 14A. Thin section analysis of clean Berea.
Figure 14B:
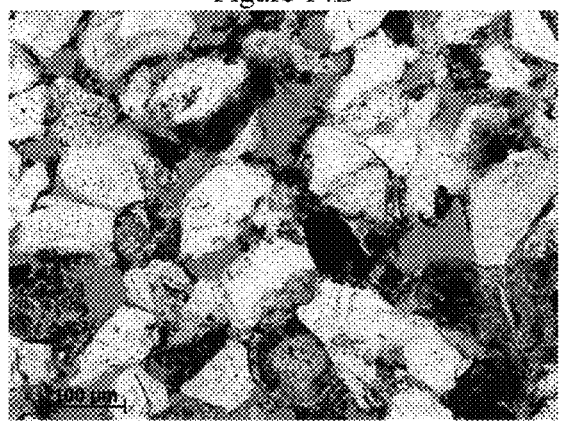
FIG. 14B. Thin section analysis of 14 day-aged Berea imbibed with brine.
Figure 14C:
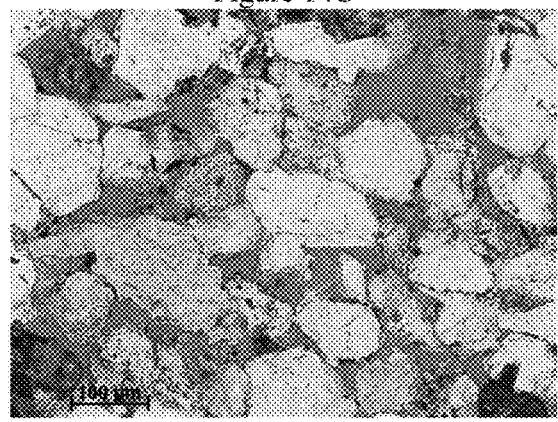
FIG. 14C. Thin section analysis of 14 day-aged Berea imbibed with 3.3 wt % surfactant.
Figure 14D:
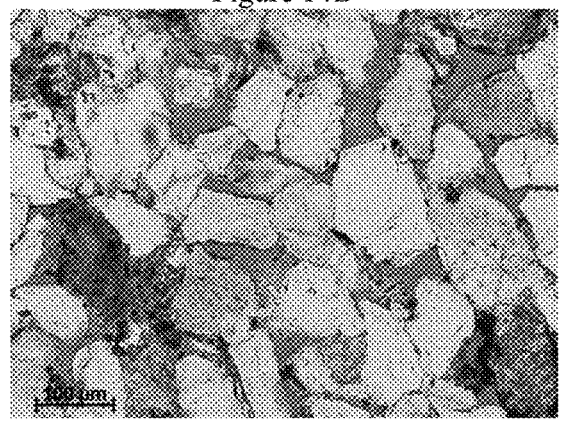
FIG. 14D. Thin section analysis of 14 day-aged Berea imbibed with microemulsion containing 3.3 wt % surfactant.

At high concentration, earlier breakthrough in Berea was recorded with surfactant compared to brine due to lower IFT and CA, although the final recovery was very similar and close to 55% (bottom FIG. 13). This is because Berea is a well-sorted sandstone rock with relatively homogeneous pore sizes (FIG. 8(a)). Brine and surfactant solution could invade into most of the pores, leaving some oil trapped due to negative threshold capillary pressures of altered surfaces and disconnection of oil caused by snap-off, which is more prone in water-wet surfaces. The addition of ME to brine could significantly enhance oil recovery from Berea and produce 86% of oil, which was 35% more than surfactant and brine. The sharp decline of IFT from 11.8 to 0.26 mN/m (FIG. 11(a)) promoted the formation of very small oil droplets (FIG. 11(b)) that were easier to mobilize through the porous rock because their sizes were smaller than the pores and throats of Berea (FIG. 8(a)). Thin sections of clean and aged Berea after spontaneous imbibition with brine, surfactant, and ME are provided in FIG. 14. Wettability alteration can be seen in FIG. 14(b) as thin oil layers adsorbed on grain surfaces that brine alone could not remove. Imbibition with surfactant and ME restored wettability to a great extent by solubilizing most of the adsorbed oil (FIG. 14(c), (d)), in agreement with CA data in FIG. 12(b).

Figure 15A:
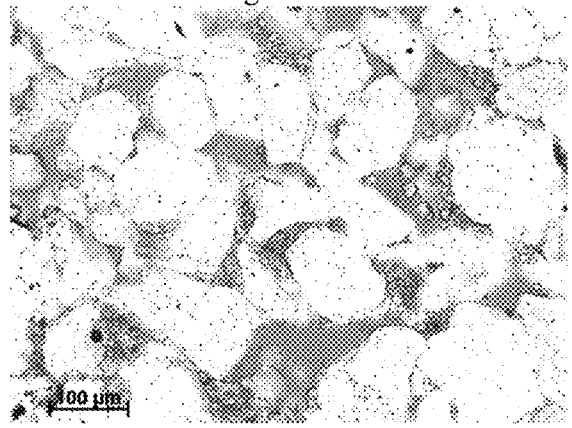
FIG. 15A. Thin section analysis of clean Tensleep.
Figure 15B:
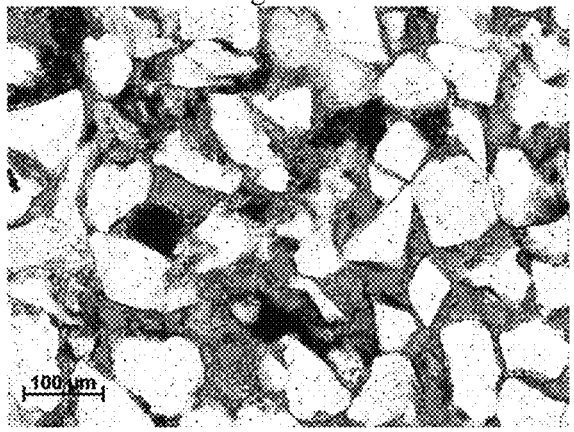
FIG. 15B. Thin section analysis of 14 day-aged Tensleep imbibed with brine.
Figure 15C:
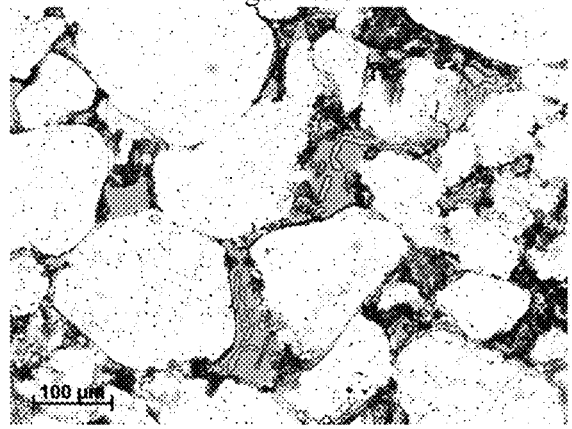
FIG. 15C. Thin section analysis of 14 day-aged Tensleep imbibed with 3.3 wt % surfactant.
Figure 15D:
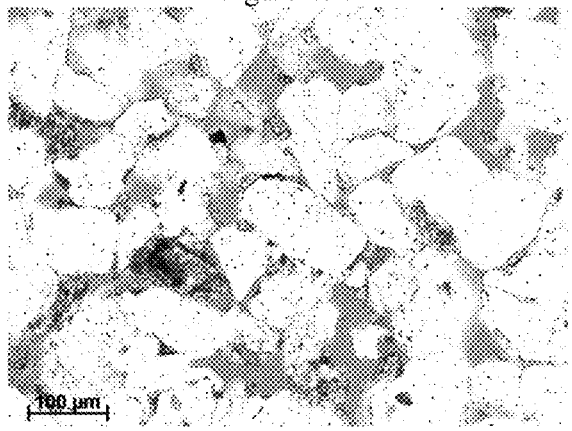
FIG. 15D. Thin section analysis of 14 day-aged Tensleep imbibed with microemulsion containing 3.3 wt % surfactant.

FIG. 13 shows the effect of high additive concentration on oil recovery from aged Tensleep cores, and their comparison with brine. Aging this rock in oil significantly altered its wettability, which explains why brine could displace less than 20% of oil from Tensleep. This is also evident in the thin sections of FIG. 15(b). The addition of 3.3 wt % surfactant to brine did not produce any oil. Examination of the thin section in FIG. 15(c) revealed that surfactant formed large bi-continuous phases at the surface of dolomite cements that could not detach within the time scale of the experiment. At such a high concentration, surfactant micelles were able to penetrate the microporous structure of dolomite cement, due to the low IFT, and trap oil in the form Winsor type I microemulsions. With increasing oil content, the small oil droplets further clustered and percolated into larger bi-continuous phases that continuously grew and diffused through the porous cement. These phases extended deeper into the oil adsorbed on dolomite surface and did not detach from it because the surfactant could not alter its wettability. The accumulation of these phases on dolomite eventually blocked the water channels within the first day, significantly impeding oil recovery. This behavior was not observed with microemulsions. In fact, MEs enhanced oil recovery to 61% (FIG. 13). The high performance of MEs could be explained by two distinct mechanisms: (i) enhanced mobilization of very small oil droplets due to the low IFT between oil and ME solution, similar to Berea, and (ii) solubilization of oil adsorbed on dolomite cement, in accord with CA data in FIG. 12(b). The second mechanism was confirmed by the thin section of FIG. 15 where a large contrast between surfactant and ME was observed. MEs were very effective at cleaning up the sand grains including dolomite cements. Due to its lower viscosity, the d-limonene solvent present in MEs could penetrate and swell the oil trapped in dolomite cements, leading to more effective desorption.

Example 3—Surfactant Flooding for Aquifer Remediation

In this example, we explored the relationship between surfactant molecular structure and its efficiency in NAPL remediation. One surfactant from each of these classes (alkyl polyglucoside, alkyl phenol ethoxylate, and alkyl ethoxylate) was selected and its ability to reduce IFT and CA on contaminated rock surfaces was measured and interpreted based on its molecular structure.

Materials

The aquifer rock samples were obtained from the Arkose layer of Fountain formation located in east Colorado and Wyoming. Several core plugs were drilled with a diameter of 1.5 inches (or 38 mm) and dried in an oven for at least 24 hour before measuring their permeability and porosity. The porosity of the rock samples was found to be in the range of 12-20% and their permeability varied between 2 and 25 mD. The mineralogy analysis of these rocks shows that the dominant minerals are quartz (70%), feldspar (15%), calcite (10%), and dolomite cement (5%).

The NAPL phase was a medium crude oil from Milne Point formation in Alaska. The properties of this oil are listed in Table 1 of Example 1.

The brine phase consisted of 1 M $CaCl_2$ in distilled water.

Each surfactant solution contained 0.2 wt % of one of the following surfactants: n-dodecyl β-D-maltoside, TRITON X-100, and BIO-SOFT N1-7. These nonionic surfactants are environmentally friendly, biodegradable, with low toxicity and CMC. The structure of these surfactants can be found in Table 3.

TABLE 3

| # | Name | Structure | MW (g/mol) | HLB |
|---|---|---|---|---|
| 1 | n-Dodecyl-β-D-maltoside | (structure shown) | 510 | 13.35 |
| 2 | BIO-SOFT N1-7 | $CH_3(CH_2)_{10}(OC_2H_4)_7OH$ | 481 | 12.9 |
| 3 | TRITON X-100 | (structure shown), n = 9.5 | 625 | 13.5 |

Experimental Procedure

The experimental procedures for IFT, CA, and spontaneous imbibition measurements are similar to the ones used in Example 2.

The amount of surfactant adsorption on crushed Arkose rock was determined by UV-Vis spectroscopy. The UV-Vis absorbance of surfactant solutions with various concentrations was measured before and after exposure to crushed rock grains with a diameter of 100-200 μm. First, 1 g of grains was mixed with 25 g of surfactant solutions with different concentrations. The mixtures were shaken at 600 strokes/minute for ten hours to reach equilibrium. The mixtures were then centrifuged to separate surfactant solution from the rock grains. The absorbance of the separated surfactant solutions were measured and compared with the reference curves, which were obtained from the surfactant solutions before they were mixed with the rock grains. The amount of surfactant adsorption on the rock grain was calculated and plotted at different surfactant concentrations using Langmuir isotherm.

Interfacial Tension, Surfactant Adsorption, and Wettability

Figure 16A:
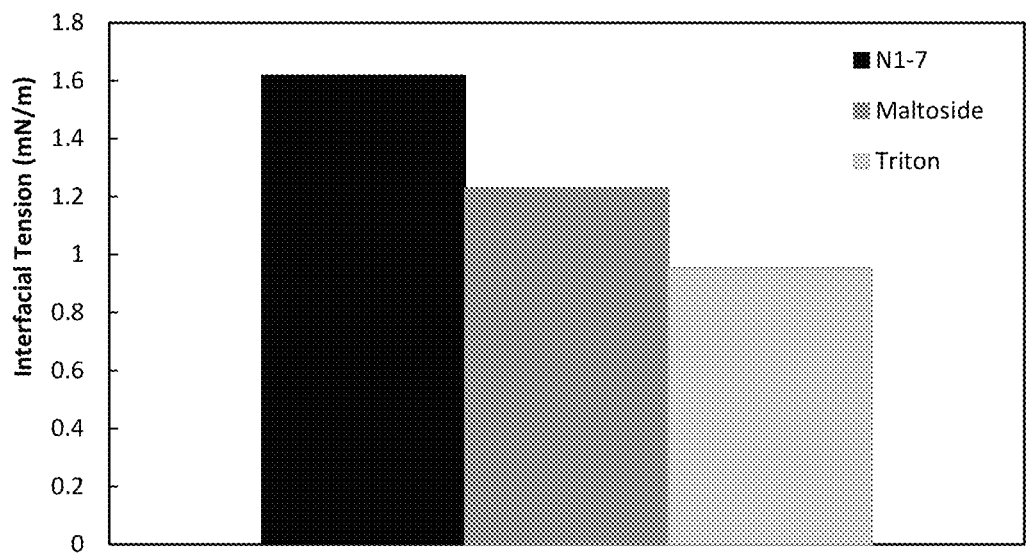
FIG. 16A. Effect of surfactants on the interfacial tension between oil and brine.

The effect of 0.2 wt % surfactant solutions on the NAPL/brine IFT was examined at ambient conditions using the pendant drop method. FIG. 16(a) shows that the addition of surfactant to brine resulted in a significant decrease in the IFT from 22.5 mN/m (IFT of brine and NAPL) to less than 2 mN/m (with an error less than 0.1 mN/m). A closer examinations of the data revealed that the IFT values with n-dodecyl β-D-maltoside and TRITON X-100 are the lowest. The presence of hydroxyl groups in the sugar head of n-dodecyl β-D-maltoside promotes the formation of strong hydrogen bonds. Although TRITON X-100 has a less hydrogen bonding head than n-dodecyl β-D-maltoside, the branched alkyl group in its tail is able to adsorb into the brine/NAPL interface and bring down the IFT significantly. The presence of branched alkyl groups in surfactant tails enhance its efficiency in lowering the IFT due to increased hydrocarbon surface area per surfactant molecule at the interface.

Figure 16B:
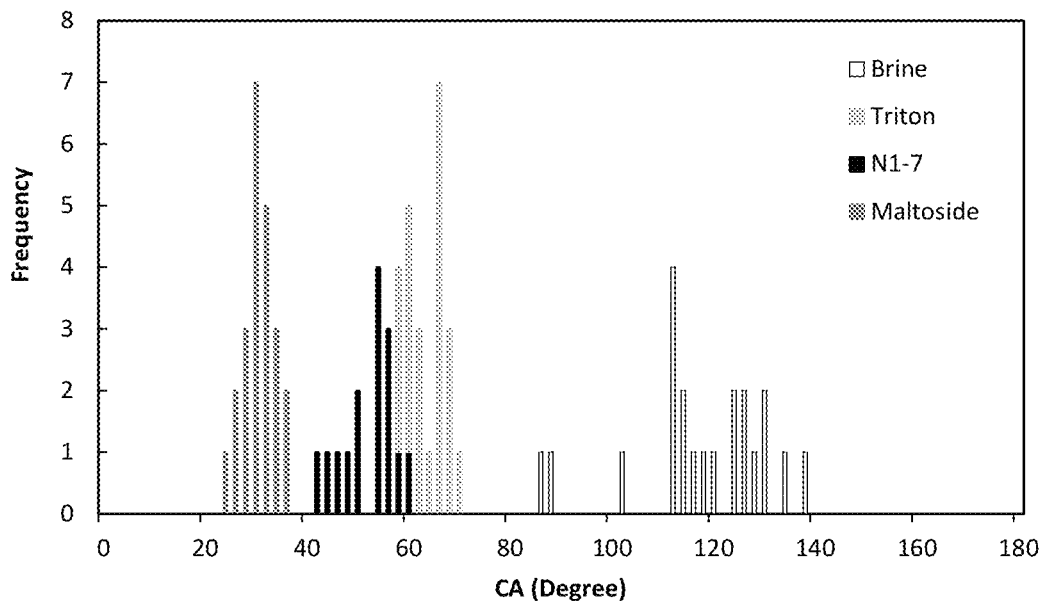
FIG. 16B. Effect of surfactants on the equilibrium contact angle of brine on oil-contaminated Arkose rocks.
Figure 17:
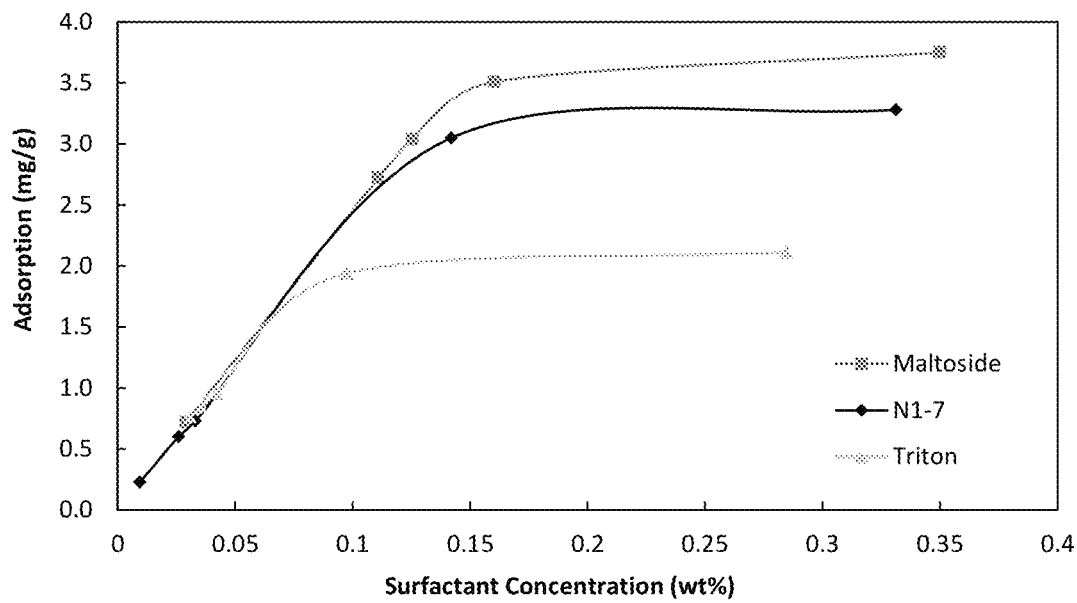
FIG. 17. Adsorption isotherms of surfactants on rock grains.

The impact of surfactants on the wettability alteration of oil-contaminated rocks was also investigated. FIG. 16(b) shows a reduction of static CA on 7 day-aged rock surfaces by addition of 0.2 wt % of surfactants to brine. For example, n-dodecyl β-D-maltoside was able to reduce the average CA from 110° to 30°. This implies a wettability alteration of NAPL-contaminated rock surfaces from weakly water-wet back to water-wet. The wettability reversal could be explained by the dual adsorption of surfactant molecules via their hydrophobic tails on the thin asphaltene layer and via their hydrophilic heads on the rock surface, causing asphaltenes to detach. To verify this mechanism, we measured the adsorption of these surfactants on Arkose rock by UV-Vis spectroscopy. FIG. 17 reveals that hydrogen bonding is the driving force for adsorption. Indeed, n-dodecyl β-D-maltoside with a large number of hydroxyl groups in its sugar head shows a greater amount of adsorption. Both BIO-SOFT N1-7 and TRITON X-100 have alcohol ethoxylated heads, however the straight-chain alkyl tails of BIO-SOFT N1-7 appear to favor adsorption more than the branched-chain groups of TRITON X-100, probably due to less steric effects.

Spontaneous Imbibition

Figure 18:
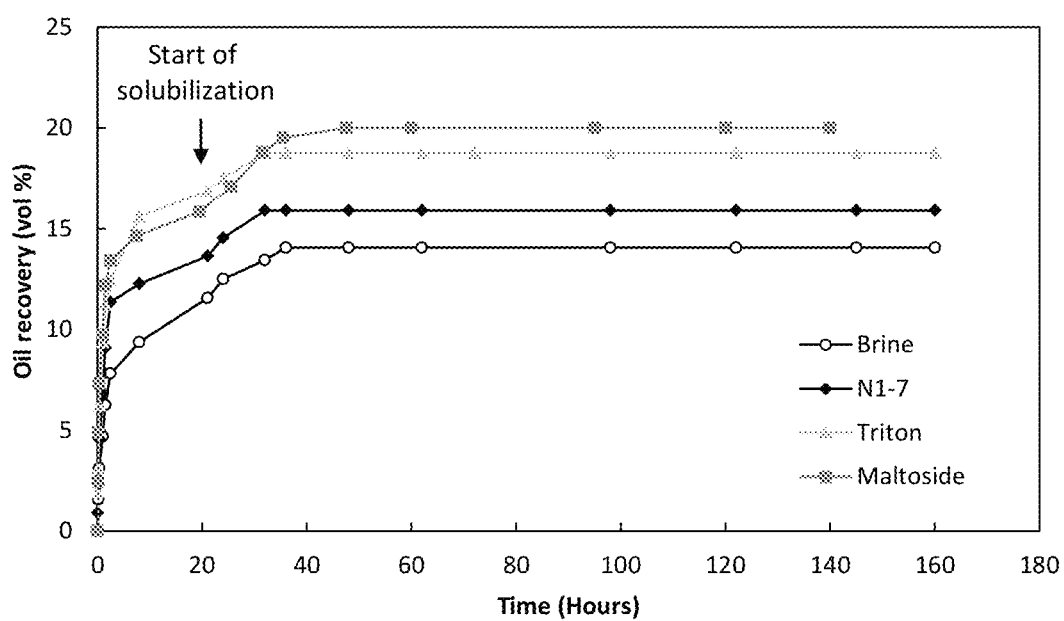
FIG. 18. Effect of surfactants on oil recovery from Arkose cores containing 50% initial water saturation.

The amount of NAPL removal from Arkose core containing 50% of initial water saturation is shown in FIG. 18, as a percentage of NAPL produced by spontaneous imbibition of brine solutions. The amount of NAPL mobilized by brine alone is about 15 vol %, which is due to the mobilization of oil in smaller pores that can easily be invaded by brine. Based on the CA data, brine alone does not have the ability to desorb asphaltenes from mineral surfaces, which explains why no solubilization was observed.

We repeated the spontaneous imbibition tests on contaminated core samples with all three surfactants. The amount of NAPL recovered by the surfactants versus time was recorded. After 150 hours, all surfactants showed more recovery compared to brine. Because of the lower IFT, the surfactant solutions could invade small pores as well as large pores. Contaminant removal starts by a fast mobilization of oil from the porous rock. As the production curve reaches an inflection point or a distinct jump, solubilization of asphaltenes occurs. This jump depends on the solubilization amount and is more obvious in low permeability rocks. Solubilization is slower than mobilization since it is a kinetic process that involves asphaltene desorption by surfactant molecules. The desorption can restore the wettability of contaminated surfaces back to their original water-wet condition and reduce the threshold capillary pressure needed for brine to invade the pores. Therefore, another stage of NAPL recovery starts. Assuming that the imbibition curves due to mobilization with and without surfactants have the same trend, we can estimate the amounts of mobilization and solubilization for each surfactant. The volume of NAPL mobilized by TRITON X-100 was slightly higher than n-dodecyl β-D-maltoside due to its slightly lower IFT. BIO-SOFT N1-7 showed lower initial NAPL removal, which implied its weaker ability to mobilize NAPL. This is in line with the higher IFT of this surfactant with NAPL compared to other surfactants. On the other hand, the volume of asphaltenes solubilized with n-dodecyl β-D-maltoside was slightly larger than TRITON X-100 due to its higher ability to alter wettability. In fact, the solubilization amount decreased from n-dodecyl β-D-maltoside to BIO-SOFT N1-7 to TRITON X-100. This result is in good agreement with the wettability alteration trend in FIG. 16(b), and their adsorption propensity in FIG. 17.

Correlations Between IFT, CA, and Spontaneous Imbibition

Figure 19A:
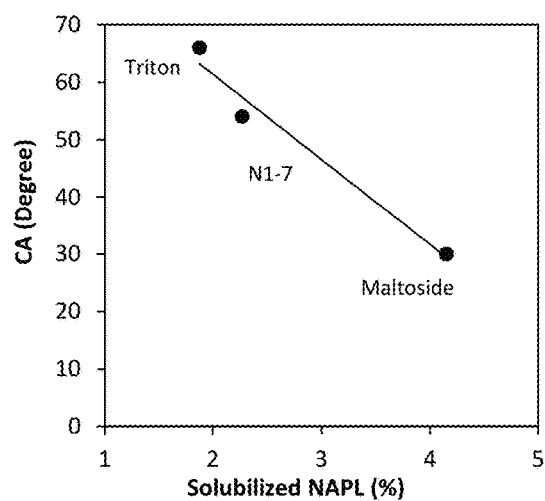
FIG. 19A. Correlations between amount of solubilized oil and CA.
Figure 19B:
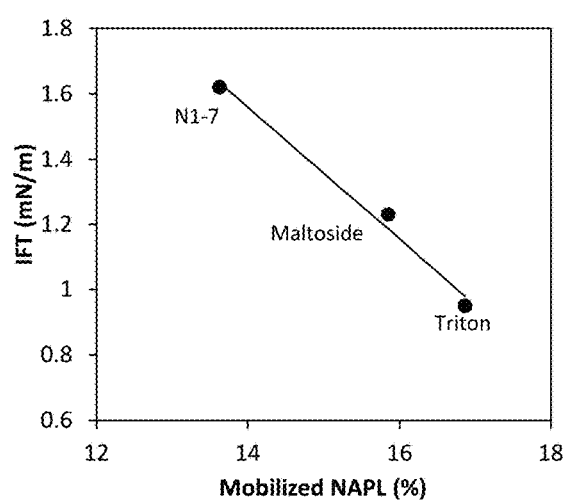
FIG. 19B. Correlations between amount of mobilized oil and IFT.

Based on the CA/IFT measurements and imbibition tests, linear correlations were established between the amounts of mobilized and solubilized NAPL by surfactants and their ability to reduce IFT and CA, respectively. FIG. 19 indicates that maltoside was able to reduce the CA more than the other surfactants by forming the strongest hydrogen bonds and having the highest adsorption tendency on the rock surface; therefore the amount of solubilized asphaltene with this surfactant was the highest. On the other hand, the presence of branched alkyl groups in TRITON X-100 causes the surfactant to dissolve more in the NAPL phase, which reduced IFT and promoted mobilization of NAPL more than other surfactants.

Figure 20:
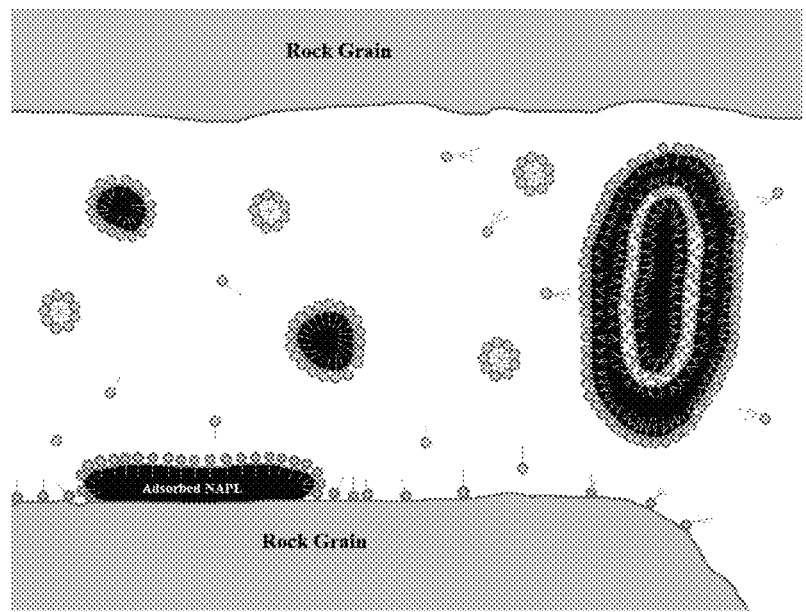
FIG. 20. Schematic of oil removal from contaminated porous rocks.

These results suggest that mixtures of surfactants with two structural types can promote both mobilization and micellar solubilization of NAPL in porous media. Type 1 contains a linear tail and a large hydrogen-bonding head, whereas Type 2 has a highly branched tail and a smaller hydrogen-bonding head. A schematic of the displacement mechanism is shown in FIG. 20 (Javanbakht and Goual, 2016).

Example 4—Microemulsions with Combination of Surfactants for EOR

The performance of microemulsions in EOR processes was further studied in this example through spontaneous imbibition tests with single nonionic surfactants and with combinations of nonionic surfactants with branched and linear tails. The goal was to demonstrate that microemulsions containing such surfactant combinations are more effective than those based on single surfactants.

Materials

The rock consisted of Edwards limestone, which contains 99.5% calcite and 0.5% quartz. The rock was drilled and cut into small cores 1 inch in diameter and 5 cm in length. Each core was baked at 110° C. for 24 hours to remove any water.

The NAPL phase was a medium crude oil from Milne Point formation in Alaska. The properties of this oil are listed in Table 1 of Example 1.

The brine phase consisted of 1 M $CaCl_2$ in distilled water.

The nonionic surfactants used for the preparation of microemulsions are listed in Table 4. They have very distinct structures and their HLB number varies between 11 and 16. Surfactants 1-3 have linear tails and surfactants 4-5 have branched tails. Surfactants with linear tails promote oil solubilization by adsorbing on minerals surfaces and altering their wettability whereas surfactants with branched tails favor oil mobilization by significantly reducing the IFT. Thus, we considered mixtures of surfactants with linear and branched tails in the formulation of microemulsions to enhance their efficiency.

TABLE 4

| # | Name | Structure | MW (g/mol) | HLB |
|---|------|-----------|------------|-----|
| 1 | n-Dodecyl-β-D-maltoside | 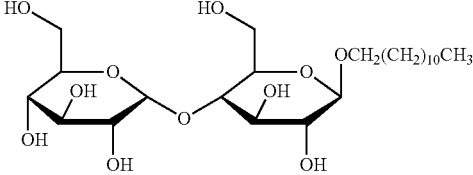 | 510 | 13.35 |
| 2 | BIO-SOFT N25-9 | $CH_3(CH_2)_{11-14}(OC_2H_4)_9OH$ | 597 | 13.3 |
| 3 | TWEEN 40 | 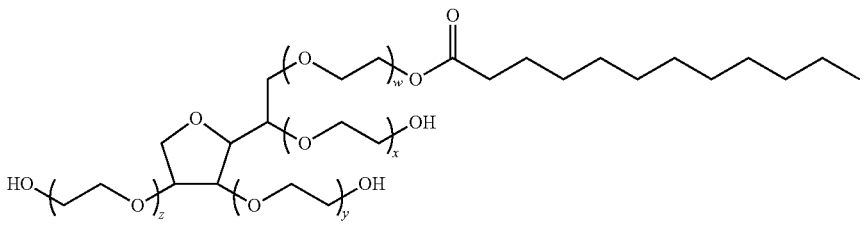<br>w + x + y + z = 20 | 1277 | 15.6 |

TABLE 4-continued

| # | Name | Structure | MW (g/mol) | HLB |
|---|------|-----------|------------|-----|
| 4 | TRITON X-100 | 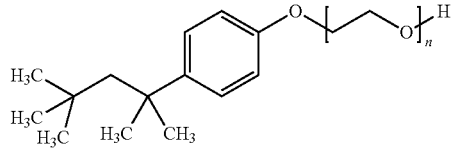 n = 9.5 | 625 | 13.5 |
| 5 | TERGITOL TMN-6 | 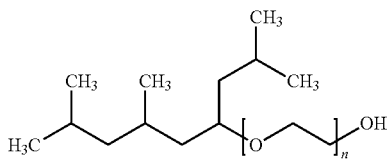 n = 8 | 538 | 11.7 |

Formulations were prepared comprising 0.8 wt. % microemulsions in brine according to the procedures described in Examples 1 and 2. Each microemulsion contained 0.3 wt. % surfactant, which were selected from BIO-SOFT N25-9 alone; TRITON X-100 alone; TWEEN 40 alone; TERGITOL TMN-6 alone; a combination of 1:1 by weight TRITON X-100 and BIO-SOFT N25-9; a combination of 1:1 by weight TRITON X-100 and n-dodecyl-β-D-maltoside; a combination of 1:1 by weight TERGITOL TMN-6 and BIO-SOFT N25-9; and a combination of 1:1 by weight TRITON X-100 and TWEEN 40.

Formulations with surfactant combinations ranging from 9:1 to 1:9 by weight are also effective.

Experimental Procedure

The experimental procedures for spontaneous imbibition tests described in Example 2 were followed.

Spontaneous Imbibition

Figure 21A:
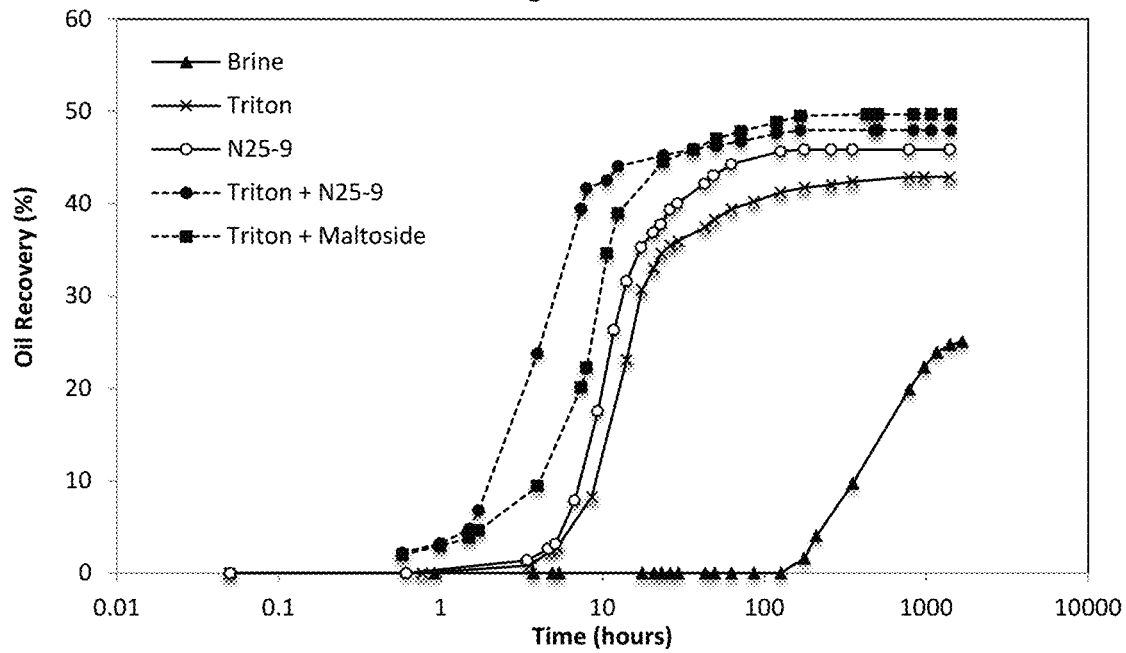
FIG. 21A. Comparison of oil recovery using 0.8 wt. % microemulsions with a single surfactant and with a combination of surfactants with linear and branched tails: TRITON X100, BIO-SOFT N25-9, TRITON X-100+BIO-SOFT N25-9, TRITON X-100+n-dodecyl-β-D-maltoside.
Figure 21B:
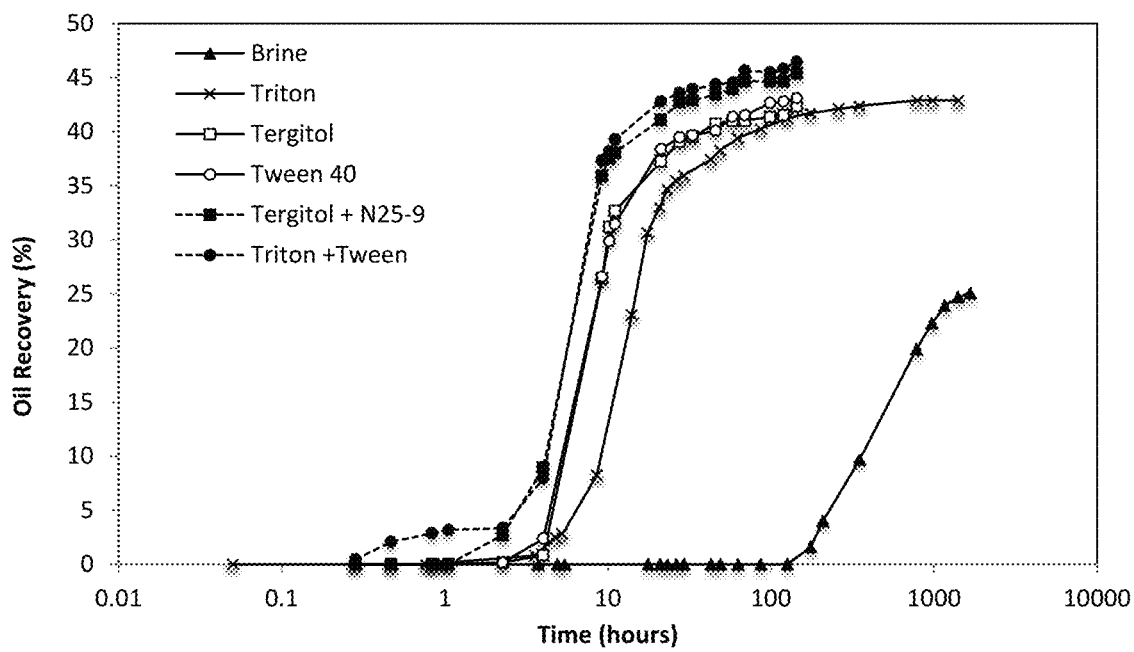
FIG. 21B. Comparison of oil recovery using 0.8 wt. % microemulsions with a single surfactant and with a combination of surfactants with linear and branched tails: TRITON X100, TERGITOL TMN-6, TWEEN 40, TRITON X100+ TWEEN 40, TERGITOL TMN-6+BIO-SOFT N25-9.

Spontaneous imbibition tests were performed on Edwards limestone, which had been aged in Milne Point crude oil for 7 days (FIG. 21). Although all microemulsion formulations resulted in enhanced oil recovery, the combination of TRITON X-100 with BIO-SOFT N25-9, TWEEN 40, or n-dodecyl-β-D-maltoside; and the combination of TERGITOL TMN-6 with BIO-SOFT N25-9 resulted in superior oil recovery. In particular, these combined microemulsions result in earlier breakthrough and faster rate of imbibition.

The structures of surfactants mentioned throughout the specification are provided in Table 5:

TABLE 5

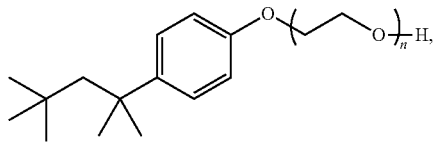

wherein n is 9.5
TRITON X-100

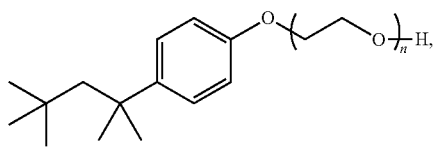

wherein n is 12
TRITON X-102

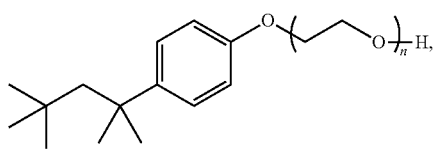

wherein n is 7-8
TRITON X-114

TABLE 5-continued
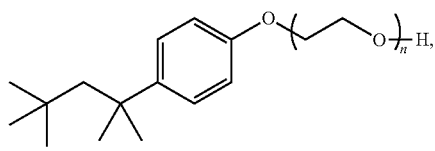
wherein n is 16
TRITON X-165
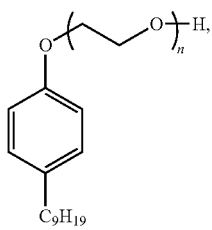
wherein n is 6
TERGITOL NP-6
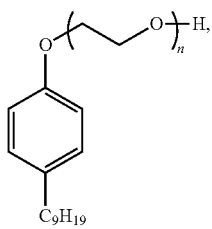
wherein n is 7
TERGITOL NP-7
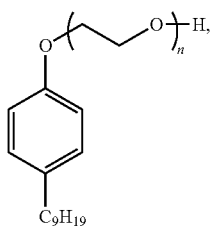
wherein n is 8
TERGITOL NP-8
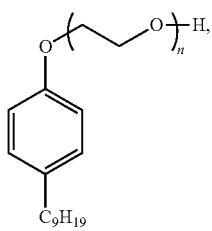
wherein n is 9
TERGITOL NP-9
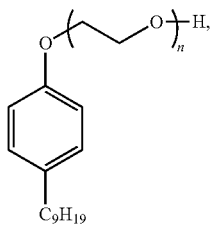
wherein n is 9.5
TERGITOL NP-9.5

TABLE 5-continued
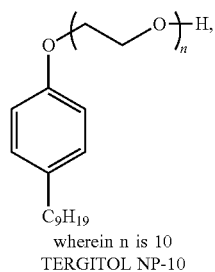
wherein n is 10
TERGITOL NP-10
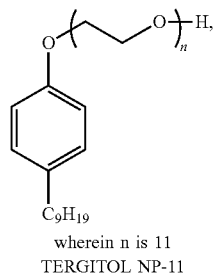
wherein n is 11
TERGITOL NP-11
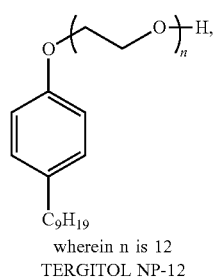
wherein n is 12
TERGITOL NP-12
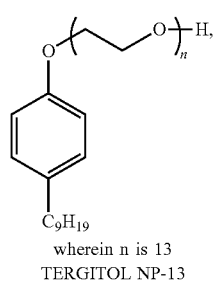
wherein n is 13
TERGITOL NP-13
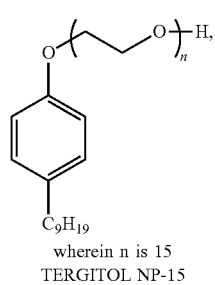
wherein n is 15
TERGITOL NP-15
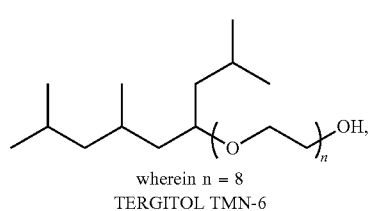
wherein n = 8
TERGITOL TMN-6

TABLE 5-continued

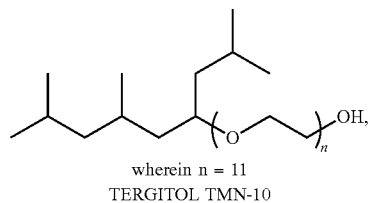

wherein n = 11
TERGITOL TMN-10

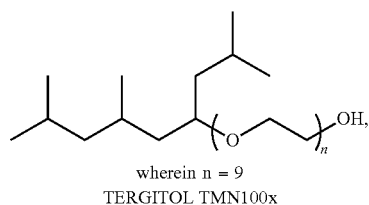

wherein n = 9
TERGITOL TMN100x $CH_3(CH_2)_{8-10}(OC_2H_4)_{6-6.5}OH$
BIO-SOFT N91-6
$CH_3(CH_2)_{8-10}(OC_2H_4)_{8.3}OH$
BIO-SOFT N91-8
$CH_3(CH_2)_{10}(OC_2H_4)_5OH$
BIO-SOFT N1-5
$CH_3(CH_2)_{10}(OC_2H_4)_7OH$
BIO-SOFT N1-7
$CH_3(CH_2)_{10}(OC_2H_4)_9OH$
BIO-SOFT N1-9
$CH_3(CH_2)_{11-12}(OC_2H_4)_{6.5}OH$
BIO-SOFT 23-6.5
$CH_3(CH_2)_{11-14}(OC_2H_4)_{7.25}OH$
BIO-SOFT N25-7
$CH_3(CH_2)_{11-14}(OC_2H_4)_9OH$
BIO-SOFT N25-9

R—O—(CH$_2$CH$_2$O)$_n$—H,
wherein R is
isotridecyl and n is 5
GENAPOL X-050

R—O—(CH$_2$CH$_2$O)$_n$—H,
wherein R is
isotridecyl and n is 6
GENAPOL X-060

R—O—(CH$_2$CH$_2$O)$_n$—H,
wherein R is
isotridecyl and n is 8
GENAPOL X-080

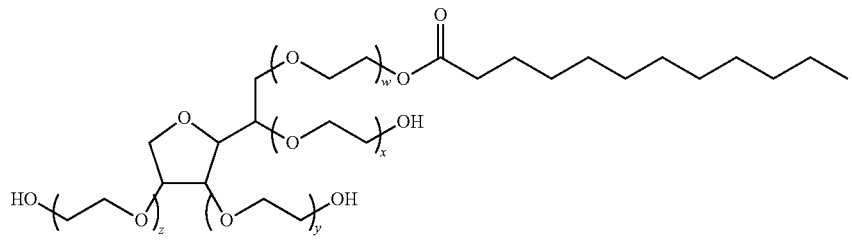

w + x + y + z = 20

TABLE 5-continued
TWEEN 20
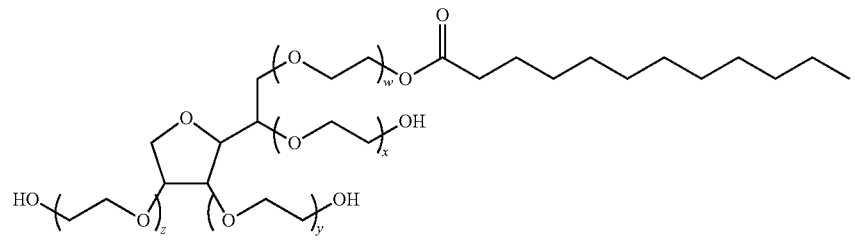
w + x + y + z = 20
TWEEN 40
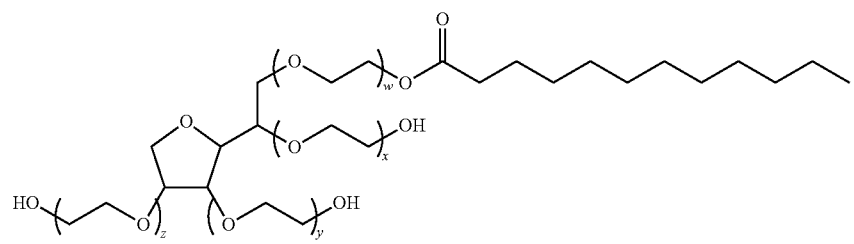
w + x + y + z = 20
TWEEN 60
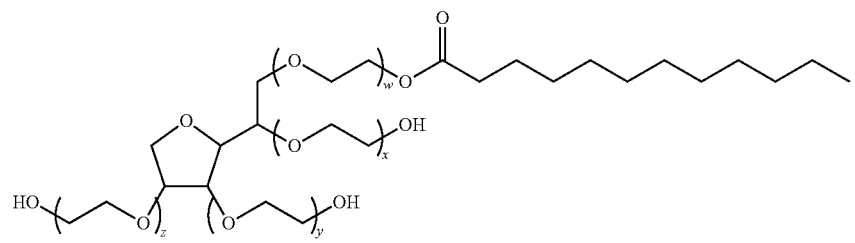
w + x + y + z = 20
TWEEN 80
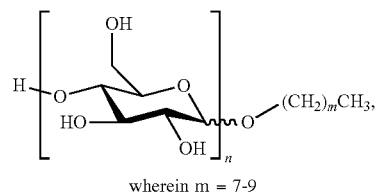
wherein m = 7-9
TRITON CG-110
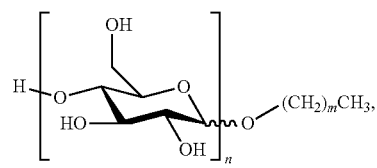
wherein m = 7-15
TRITON CG-650

The foregoing description and examples have been set forth merely to illustrate the invention and are not meant to be limiting. Since modifications of the described embodiments incorporating the spirit and the substance of the invention may occur to persons skilled in the art, the invention should be construed broadly to include all variations within the scope of the claims and equivalents thereof.

The invention claimed is:

1. A microemulsion comprising a surfactant, d-limonene, brine, and isopropanol, wherein the surfactant is a mixture of

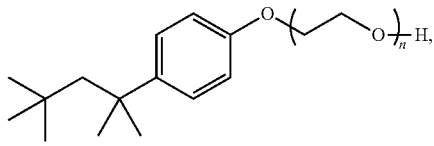

wherein n is 9.5, and $CH_3(CH_2)_{11-14}(OC_2H_4)_9OH$, and
wherein the weight ratio of surfactant to d-limonene to brine to isopropanol is 2:1:1:0.8.

2. A microemulsion comprising a surfactant, d-limonene, brine, and isopropanol, wherein the surfactant is selected from the group consisting of a mixture of

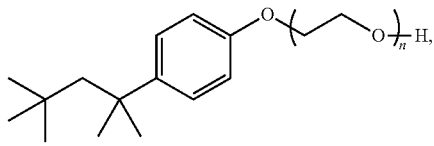

wherein n is 9.5, and
$CH_3(CH_2)_{11-14}(OC_2H_4)_9OH$, in a ratio ranging from 9:1 to 1:9 by weight;

a mixture of

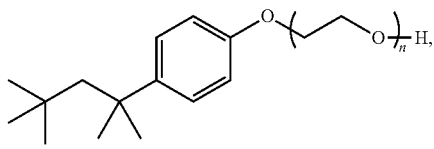

wherein n is 9.5, and n-dodecyl-β-D-maltoside, in a ratio ranging from 9:1 to 1:9 by weight;

a mixture of

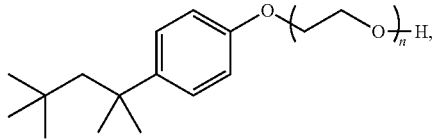

wherein n is 9.5, and

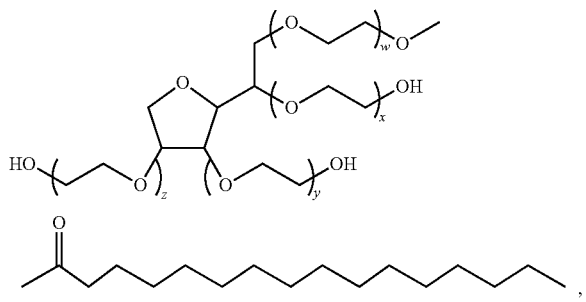

wherein w+x+y+z=20, in a ratio ranging from 9:1 to 1:9 by weight; and a mixture of

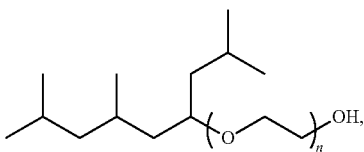

wherein n is 8, and $CH_3(CH_2)_{11-14}(OC_2H_4)_9OH$, in a ratio ranging from 9:1 to 1:9 by weight,
wherein the weight ratio of surfactant to d-limonene to brine to isopropanol is 2:1:1:0.8.

3. The microemulsion of claim 2, wherein the surfactant is a mixture of

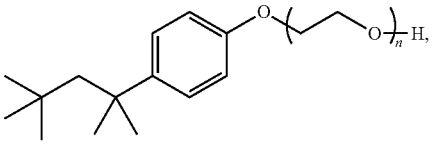

wherein n is 9.5, and
$CH_3(CH_2)_{11-14}(OC_2H_4)_9OH$,
in a ratio ranging from 9:1 to 1:9 by weight.

4. The microemulsion of claim 2, wherein the surfactant is a mixture of

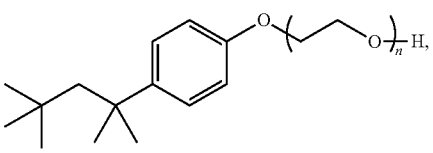

wherein n is 9.5, and
n-dodecyl-β-D-maltoside,
in a ratio ranging from 9:1 to 1:9 by weight.

5. The microemulsion of claim 2, wherein the surfactant is a mixture of a mixture of

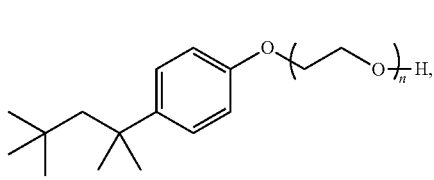

wherein n is 9.5, and

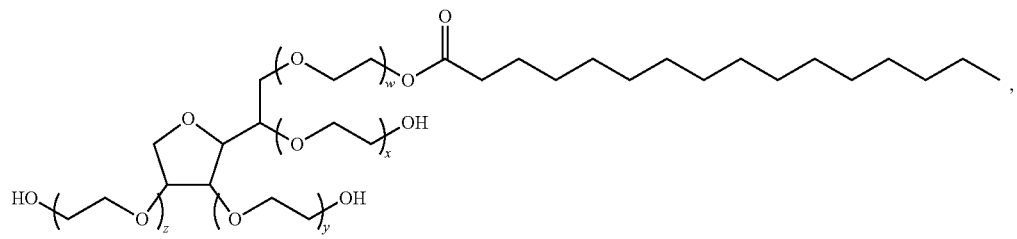

wherein w+x+y+z=20,
in a ratio ranging from 9:1 to 1:9 by weight.

6. The microemulsion of claim 2, wherein the surfactant is a mixture of

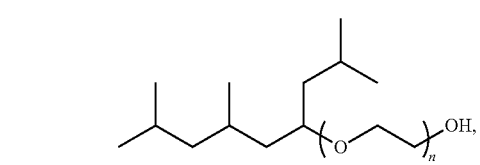

wherein n is 8, and
$CH_3(CH_2)_{11-14}(OC_2H_4)_9OH$,
in a ratio ranging from 9:1 to 1:9 by weight.

7. The microemulsion of claim 2, wherein the surfactant is selected from the group consisting of
a mixture of

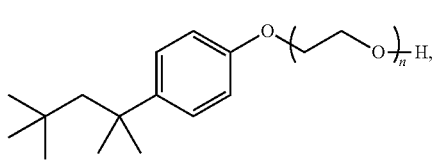

wherein n is 9.5, and $CH_3(CH_2)_{11-14}(OC_2H_4)_9OH$, in a ratio of 1:1 by weight;

a mixture of

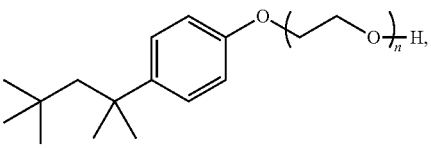

wherein n is 9.5, and n-dodecyl-β-D-maltoside, in a ratio of 1:1 by weight;

a mixture of

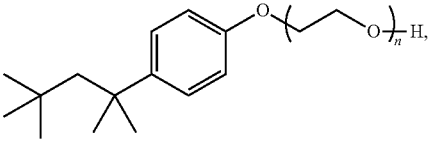

wherein n is 9.5, and

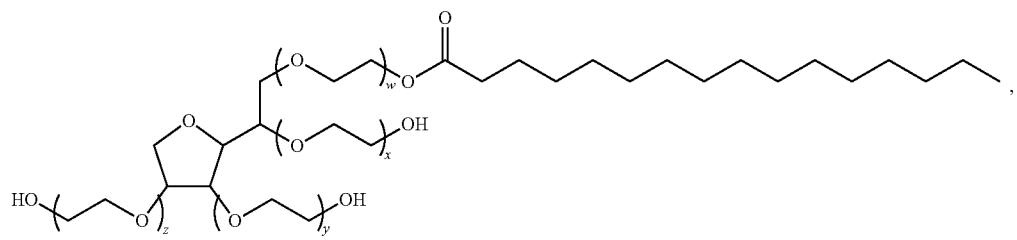

wherein w+x+y+z=20, in a ratio of 1:1 by weight; and
a mixture of

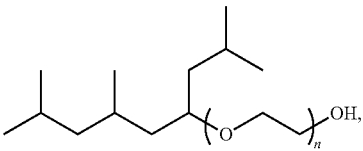

wherein n is 8, and $CH_3(CH_2)_{11-14}(OC_2H_4)_9OH$, in a ratio of 1:1 by weight.

8. The microemulsion of claim 2, wherein the surfactant is a mixture of a mixture of

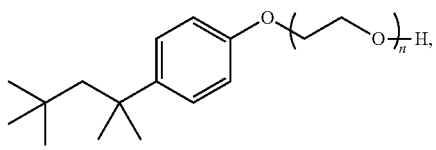

wherein n is 9.5, and
CH$_3$(CH$_2$)$_{11-14}$(OC$_2$H$_4$)$_9$OH,
in a ratio of 1:1 by weight.

9. The microemulsion of claim 2, wherein the surfactant is a mixture of

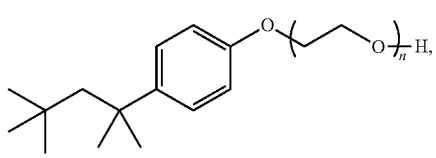

wherein n is 9.5, and
n-dodecyl-β-D-maltoside,
in a ratio of 1:1 by weight.

10. The microemulsion of claim 2, wherein the surfactant is a mixture of

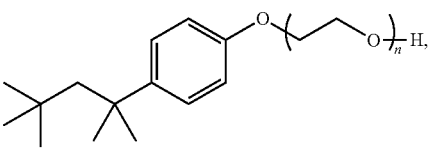

wherein n is 9.5, and

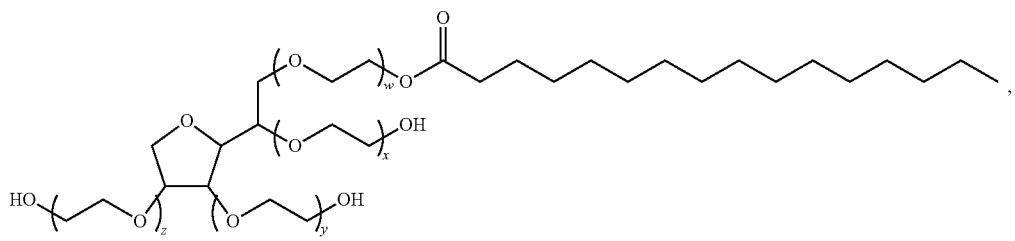

wherein w+x+y+z=20 in a ratio of 1:1 by weight.

11. The microemulsion of claim 2, wherein the surfactant is a mixture of

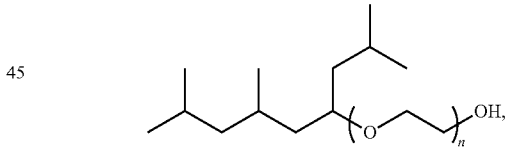

wherein n is 8, and
CH$_3$(CH$_2$)$_{11-14}$(OC$_2$H$_4$)$_9$OH,
in a ratio of 1:1 by weight.

* * * * *